(12) United States Patent
Applegate et al.

(10) Patent No.: US 8,744,633 B2
(45) Date of Patent: Jun. 3, 2014

(54) INPUT DISPENSER AND RECORDER

(75) Inventors: Doug Applegate, Oakland, IA (US);
Luke Applegate, Oakland, IA (US);
Brent Applegate, Emerson, IA (US)

(73) Assignee: Agtelligent, LLC., Oakland, IA (US)

( * ) Notice: Subject to any disclaimer, the term of this patent is extended or adjusted under 35 U.S.C. 154(b) by 481 days.

(21) Appl. No.: 12/806,370

(22) Filed: Aug. 11, 2010

(65) Prior Publication Data
US 2011/0035055 A1 Feb. 10, 2011

Related U.S. Application Data

(63) Continuation-in-part of application No. 11/519,123, filed on Sep. 12, 2006, now Pat. No. 8,504,211.

(51) Int. Cl.
*G05B 21/00* (2006.01)
*G05B 11/00* (2006.01)

(52) U.S. Cl.
USPC ............. 700/282; 700/265; 700/283; 701/50; 224/519; 296/168

(58) Field of Classification Search
USPC ....... 700/283, 285; 701/50; 180/14; 224/519; 296/168, 184; 366/141
See application file for complete search history.

(56) References Cited

U.S. PATENT DOCUMENTS

| 3,563,475 A * | 2/1971 | Emery et al. | 239/654 |
| 4,045,004 A * | 8/1977 | Berger | 366/137 |
| 5,853,244 A * | 12/1998 | Hoff et al. | 366/141 |
| 6,122,581 A | 9/2000 | McQuinn | |
| 6,457,427 B1 | 10/2002 | Moxzorn et al. | |
| 6,606,542 B2 | 8/2003 | Hauwiller et al. | |
| 6,708,631 B1 | 3/2004 | McQuinn et al. | |
| 6,732,667 B1 | 5/2004 | Wilson | |
| 6,863,006 B2 | 3/2005 | Sandoval et al. | |
| 6,938,829 B2 | 9/2005 | Doherty et al. | |
| 2003/0018423 A1 | 1/2003 | Sailer et al. | |
| 2003/0078085 A1* | 4/2003 | Gerber et al. | 460/119 |
| 2006/0238346 A1* | 10/2006 | Teller | 340/572.1 |
| 2010/0096302 A1* | 4/2010 | Astle et al. | 210/85 |

* cited by examiner

*Primary Examiner* — Mohammad Ali
*Assistant Examiner* — Sheela S Rao
(74) *Attorney, Agent, or Firm* — Camille L. Urban; David M. Breiner

(57) ABSTRACT

A liquid mixing station controlled by a computer to dispense predetermined amounts of liquid inputs based on parameters provided by an operator or program. Specifically, the invention is designed to accurately mix liquids and has an inner frame associated with a recipient tank, and an outer frame associated with the inner tank by load bars connected to the computer. The load bars signal the computer regarding weight change on the inner frame. Associated with the outer frame are minor input containers, each in fluid communication with a unique conduit and means to convey the fluid controlled by the computer. The parameters are used by a selected program and the CPU to provide appropriate ratio, sequence, and isolation of inputs. The station includes means for full removal and mix of all contents in a container, full removal of all contents from the recipient, and full clean-out of main conduit.

24 Claims, 23 Drawing Sheets

FIG. 21 PROGRAM FOR CONTINUOUS FLOW INPUT ADDITION
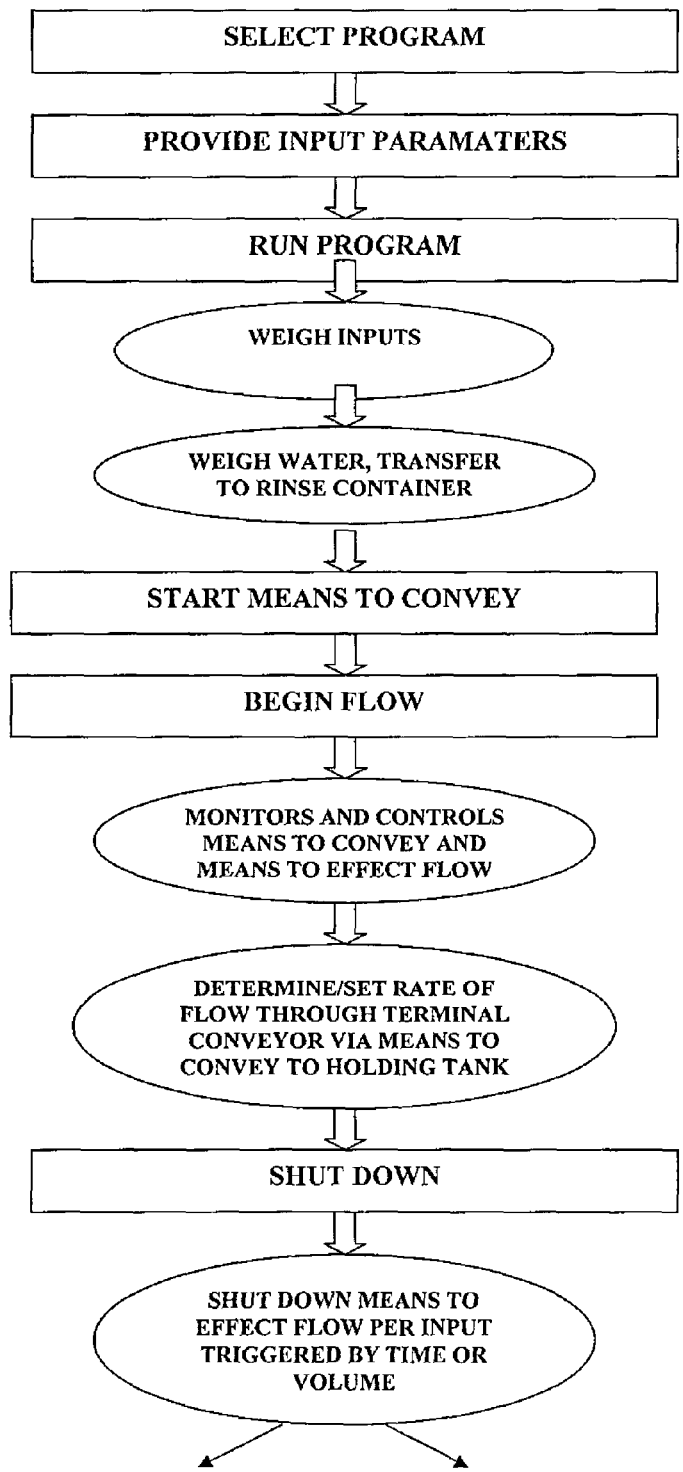

INPUT DISPENSER AND RECORDER

This patent application is a continuation-in-part of U.S. patent application Ser. No. 11/519,123 filed Sep. 12, 2006 now U.S. Pat. No. 8,504,211 entitled Input Dispenser and Recorder.

BACKGROUND OF THE INVENTION

1. Field of the Invention

Invention relating to devices used to assist agricultural operators to accurately mix and dispense inputs and record relevant data. Specifically, the invention relates to feed mixers, seed tenders, and herbicide, pesticide, and fertilizer mixers as well as farm management activities and software for analyzing and tracking related data.

2. Description of the Prior Art

As technology has advanced, the agricultural community has taken advantage of the opportunities afforded by those advances. Computer programming is now as important to many agriculturally oriented operations as the physical machinery. For example, livestock operations include tracking of feed intake per animal versus weight gain and records all medication or other inputs as well. Grain producers use global positioning interfaced with customized databases to record herbicide, pesticide, and fertilizer applications along with variety and seed treatment data.

As in most businesses, higher efficiencies and precision accuracy will increase the success of agricultural operations. Specifically, many operators wish to reduce the time required to re-load a planter. Many planters now use a single seed bin rather than a separate bin for each row on the planter. Operators often use GPS to record start and stop areas when planting a certain variety. Some operators use a blower to blow seed from a transport container to a planter thereby reducing time to load planter. Many also pretreat the seeds before bringing them to the field. The pretreatments require mixing sometimes of small amounts of potent chemicals into larger amounts of other chemicals or carriers.

After seed is in the ground, many different conditions may occur. Any one of these conditions may indicate the need to apply fertilizer or herbicides. Operators often use a recipe including multiple chemicals and a diluent all of which must be accurately metered, mixed, and recorded before dispensing. In addition, an operator may alter that recipe according to certain conditions such as weather, precipitation, time of day, etc. However, these alterations are typically determined at the time the operator is mixing the batch and are determined by the operator. Previous batch mixers did not include fully automated adding and mixing or allow for dictating a combination of manual and autoloading while recording and taking into account all relevant data. Further, the operator-determined and created batch included many opportunities for error including leaving out a component or adding incorrect amounts of a component or failure to take into account all of the factors in play prior to creating the present batch. As an added issue, mixing small amounts of chemicals presents it own issues. Each chemical or ingredient has its own container and, when emptied, the container typically has chemicals remaining in it. Often the chemical has settled and adheres as a gummy or sludgy substance in the bottom of the container. The material or chemical also remains in part in the tanks or other vessels into which the chemicals and materials are weighed or loaded. Further, mixing chemicals requires emptying multiple containers. The chemicals are expensive and difficult to measure. Measuring vessels must also be rinsed adding to the difficulty . . . .

Operators of livestock setups are also faced with record keeping challenges relative to inputs. Reduction in time required to measure and mix additives to feed and a method to record the amounts, ratios and identity of recipient livestock is crucial to the stewardship of herds. However, feed mixers are not often equipped to track herd identifiers relative to source of input or to automatically apply a particular ratio in a mix according to the herd identifier and predetermined criteria associated with that herd. Further, the inventory of feed source and additive sources were difficult to manage.

What was needed was a basic and transportable structural and programming framework that can mix, measure and record inputs for batch production in grain crop planting and growth applications as well as livestock feeding in order to save time and increase the accuracy of data recordation. Further, this framework needed to include capabilities for application of predetermined criteria to tailor a predetermined ratio of inputs according to real time or near real time conditions as well as relative to the conditions of the receiving organisms. Finally, the framework would need to be equipped to store and/or transmit all data to other systems in order to assist in full farm management activities.

There was also a need to include in the apparatus specific means for assuring that all materials or chemicals were voided from their original containers and from the apparatus when the final mixture was transferred. Clean containers will meet EPA rules for disposal. It is also likely that, in the future, these containers will not be disposed of but, rather, will be returned to the source. Such return is likely to be aided by RFID technology, or a similar identification and tracking tool, in order to identify the container and its original contents. This same information may also be available to the recipient of the full container for accurate tracking of identity, lot numbers, etc. A framework or station having the ability to accept this data provided either electronically or manually, and clean the containers prior to return would offer many advantages for accurate mixing, tracking, validation and reporting.

A need further existed for a mixing station that would be compact and either stationery or portable, as required, and that would serve to assist in the complex and highly accurate mixing of materials. The station would add further benefit by providing mechanisms for full clean out of the station and any containers in which the materials have been stored.

The first objective of the present invention is to improve the accuracy of recording inputs relative to geography;

A second objective of the present invention is to improve the accuracy of proportionate batch mixing through computer-aided measurement;

A third objective is to improve time efficiencies of mixing and loading inputs from transporter to applicator;

A fourth objective is to record relevant data pertaining to mixing and amounts of inputs relative to inventory management for download or real-time communication with pre-existing farm management data collection tools including historical analysis, work order creation, and planning;

A fifth objective is to allow automated adjustments of predetermined input ratios according to specified criteria such as weather, herd condition, time of day, weed growth, disease pressure, wind speed, etc., and to record all such criteria along with the batch ratio actually mixed along with time, date, herd identifier, and geographic coordinates;

A sixth objective is to reduce or eliminate human error in determining the appropriate ratios of inputs, creating the appropriate mixtures, and recording all relevant data;

A seventh objective is to provide a mechanism for consistent and substantially complete removal of materials from their storage containers, and tracking of all rinse materials;

An eighth objective is to provide a stationary mixing station including mechanisms for accurate measuring and clean out capability taking into account final mix ratios and, for a portable station having the capability of compensating for effects of slope on weight readings;

A ninth objective is to provide a way to identify and store identifying information regarding materials in a container, the container sources, and the use of materials in the container and its status as new/used/rinsed. Associating the use with data, time, location of application or weather conditions is also an objective of the present invention.

Additional objectives includes means to report and record rinse records with returned containers and for reporting obligations to regulatory agencies.

A final objective is to automatically identify containers and operators.

SUMMARY OF THE INVENTION

Today's agricultural operator spends as much time planning and managing in his office as physically working in the field or feedlots. Many operators have a number of employees carrying out a variety of duties, each employee having a different skill level. In addition, the climate of agricultural production calls for higher precision in application of inputs and tracking of source and destination of each input. Careful analyses of past successes and failures in conjunction with application of the newest theories are the requisites for well-managed operations and require databases with appropriate data. The foregoing can only be accomplished through computer-assisted machinery designed to remove human error and to record all necessary data points. Appropriate records aid protection of food supply.

In its most basic form, the present invention is an input dispenser/recorder comprising an inner frame and an outer frame mounted on wheels or tracks and including a hitching means for transport purposes. In the preferred embodiment, it is transported to a field or feeding area where it remains stationary while it mixes inputs and then dispenses the mixture to an applicator. The applicator then transports and applies the mixture simultaneously.

Preferred embodiments include load bars placed between the inner frame and the outer frame and comprises at least one electronic scale for accurate recordation, inventory management, and application combinations. Means to convey inputs, and a CPU with touch pad or key pad inputs are included in the dispenser/recorder. Programming to record desired inputs, calculate amounts of desired inputs, track inventory remaining, and related information and to control means to effect the addition and/or mixing of inputs based on operator criteria and parameters is incorporated. The preferred embodiments also include wireless communication with the applicator's on-board system and/or office system in real time or through downloading wherein the data includes GPS coordinates and time stamps. Local instrumentation to detect weather conditions may also be employed in the preferred embodiments wherein these conditions may be used as criteria in the programming algorithm to determine necessary ratios of inputs. Weather conditions may, instead, be provided to the CPU via download from another system or by manual input from the operator.

Some embodiments of the input dispenser/recorder may be configured to dispense dry, wet, or a combination of dry and wet inputs. Specifically, major input containers are usually associated with the inner frame. Each major input container has an opening through which its contents are dispensed. The opening is positioned over an orifice equipped with a shut-off mechanism in fluid communication with the conveyor. Via the load bars, the inner frame is associated with the at least one electronic scale electrically connected to the CPU. The scale informs the computer of weight change in the major inputs containers during dispensing of inputs. It is contemplated that each major input container may also be associated with a singular electronic scale to separately track weight changes.

Minor inputs in minor containers are associated with the outer frame. Each has an opening through which material flow is metered and which is in fluid communication with the means to convey inputs. Ratios of a plurality of inputs in a resulting mixture may be controlled by a combination of monitoring weight change, speed at which said means to convey are operated, and the control of flow meters all in communication with the CPU and program. In one embodiment, the outer frame may include hollow portions that act as a reservoir for hydraulic fluid.

The CPU includes programming such that an operator may provide specific parameters and the computer will determine the weight (or volume) of each input required, and the amount and flow of the input necessary to achieve the desired mixture. The programming will electronically control the opening and closing of shut-off valves and flow meters such that the correct amounts and mixtures are attained during dispensing and conveying.

A further feature of the input dispenser/recorder provides for pre-programmed dispensing. Although the conveyors may run continuously, the program facilitates dispensing mixture only in amounts dictated by the capacity of the receiving container or containers. Where multiple receiving containers will be used, preprogrammed time delays can drastically increase the efficiency of dispensing the mixture into the containers.

In one preferred embodiment for liquid, inputs (major or minor) are singly dispensed. Means to convey include a pump and conduit. A valve to a recipient container is controlled by the CPU and the recipient container is associated with an electronic scale. The recipient container empties the single input into a mixing container, an automatic rinse of the recipient container occurs and then the next liquid is weighed into the recipient container. For very small liquid amounts, the CPU may prompt the operator to add it to the mixing tank in the correct order and amount. The operator then indicates that the input was added and the program resumes its automated activities. In the case of addition of a major input in the form of a diluent, the major input container may be gravitationally positioned and equipped with an opening controlled by the CPU such that the diluent can be added without pump or valve to the recipient tank where its weight is monitored and the CPU closes the opening when the appropriate weight is reached. In yet another modification, rather than the CPU controlling a pump and valve associated with each input, the CPU may prompt the operator to add each particular input one at a time. As the required weight of the particular input is neared (as monitored in the recipient tank by the CPU) the CPU will alert the operator to stop the flow, the CPU then measures and records the exact weight added. The CPU then prompts the addition of each input in the same manner thereby assisting the operator to mix the liquids in proper order and proper amount of each input. The mixing container preferably includes an agitator which is controlled by the CPU in conjunction with preprogrammed time delays in the program.

Means to convey may include belt conveyors, flighted augers, or some combination thereof run by motors and hydraulics. In the liquid version, conduits, valves, and pumps will replace the belt or flighted augers as necessary. In addition, an air delivery system may be employed whereby an air source and pressure source work within a conduit system to transport a mixture of mostly dry inputs or to more completely evacuate liquid inputs. Each possibility has advantages; the belt system is easier to clean out and is usually faster. However, a flighted auger system will provide better mixing for more even applications. Pumping mechanisms can offer even further mixing assurances. The air delivery system offers the advantages of speed and increased accuracy, however, it is more complex with the inclusion of air locks. Positioning of the final auger or conduit relative to the CPU provides easy access and control; it folds into the outer frame for transport ease. This also increases operational safety and makes operation more readily achievable even for an operator with disabilities.

The data parameters provided by the operator and the program's relative outputs are all recorded with time and date stamps. In one embodiment, the operator may input field identifiers along with mix parameters and characteristics of the input such as seed size. In another embodiment, GPS location coordinates are incorporated for more accurate records of location. As mentioned above, current weather, growing conditions, weed size, pest, and disease pressure, etc., may be input either electronically or by the operator and the program written to include algorithms wherein these conditions are taken into account in the mixture to be created. The data can then be cross-loaded either in real-time or as periodic downloads accomplished either by wireless or physical means, to other production management software for seamless viewing and analysis of inputs by location, yield, outcomes and other variables in addition to providing access to present inventories available and totals of products (inputs) used to date or within a given time frame. Inventories in storage can therefore be managed and the location at which each input is applied can be positively identified for tracking purposes relative to GMO's, growing first generation hybrid seed, chemical applications, etc. The production management software can also download to the dispenser or a transportable medium, work orders for a specific job or a recipe for a mixture and provides for reporting of completed jobs.

The wireless version allows the operator to actuate the input dispenser/recorder and input parameters remotely. This may mean the operator stays on the tractor pulling a planter or the sprayer or the feed wagon rather than dismounting to reload. This approach results in safer mixing of chemicals and in higher efficiencies in application.

In one embodiment for use with planters, the input dispenser/recorder functions as an automated seed tender. Seed containers function as major output containers wherein dispensing of seed is largely controlled by a butterfly valve in the orifice and in communication with the CPU. Seed treatment containers function as minor input containers and are preferably mounted on the outer frame. Treatment flow is controlled by flow meters or metering pumps rather than weight change. The seed containers are secured to the inner frame and associated with at least one electronic scale through load bars. As the seed enters the conveying means it is transported past an orifice through which at least one seed treatment is applied and the seeds and treatment are mixed as the seed is moved. In a preferred embodiment, a set tank is provided in which treated seeds may be temporarily held. The set tank is associated with means to vibrate liquid treated seeds which allows the liquid to "set" on the seeds and prevents bridging when the seeds are finally conveyed to the planter. The mixing, dispensing and set can be completely automated such that these actions occur while the operator is planting and is finished when the planter requires more seeds.

In addition to calculating and dispensing the required amount of seed and treatments for the desired number of acres, the system keeps a running record of inputs remaining on the dispenser/recorder based on weight and will display the number of acres that may be planted with the remaining amounts of inputs. The seed containers are secured to the inner frame by a tension-secured rail that is hand-operable to swing into place once the containers are set in place on the inner frame. This tension rail can be adjusted in position so that it can be applied with other containers, as well.

The automated seed tender preferred embodiment is equipped with means for cleaning the conveyors. Specifically, conveying means comprises a plurality of flighted augers each positioned inside a tubular housing. At end of dispensing, each flighted auger is lowered to near contact with the tubular housing. This action is triggered by a change in torque on the drive motor and a mechanism that is dependant on torque. Lowering the auger cleans out the tubular housing.

An additional modification includes a small seed bin mounted on the outer frame. Should an operator have a small amount and known weight of seed, he can load the bin from the bed of a pickup truck. The seed bin is in fluid communication with said means to convey and seed treatments. Flow of seed from the seed bin is governed by the CPU through a valving mechanism.

In another embodiment, at least one liquid major input container is secured to the inner frame. Typically, this holds the diluent which is often water. Minor input containers are associated with the outer frame or the inner frame. In the preferred version of the liquid embodiment, the flow of the major input container is controlled by a valve and pump or via gravity and an opening controlled by the CPU; flow of the minor input container contents is typically controlled by the CPU using a pump and valve. Each minor input container is in fluid communication with a conduit system which is connected to a recipient container. The recipient container is associated with an electronic scale and fluidly connected to a mixing tank through a stop valve. Each input is weighed as it enters the recipient tank and emptied into the mixing tank before the next input is weighed. The major input container may include a flow meter to measure the required amount of diluent to be transferred to the mixing tank or it may simply be gravitationally positioned such that the CPU opens the opening until the appropriate weight is in the recipient tank and then closes the opening. The preferred embodiment includes an agitator in the mixing tank. Once again, via manual or electronic input of parameters, the CPU controls the valves and pumps to effect flow of each input to the recipient tank, detect appropriate weight, and transfer it to the mixing tank and to meter the appropriate amount of diluent. Further, a time sequence for mixing can be effected by the CPU via the program. As alternatively described above, the addition of certain inputs may be prompted, weighed and recorded by the CPU and program although physically effected by the operator.

Finally, it is important to maintain a record of weather conditions present during the application of certain herbicides, pesticides, fungicides. Some operators also keep track of weather conditions when planting. The dispenser/recorder's preferred embodiment includes automatic recordation of weather conditions pertaining at the time a batch of the mixture is dispensed to the applicator. Such conditions can be obtained from local information, or on-line services, or may be detected by a dispenser equipped with appropriate instrumentation. At its simplest, the dispenser will not dispense until an operator inputs general conditions such as temperature, wind direction and speed, cloud cover, precipitation. This information is may be used by the program to calculate new ratios and/or communicated to the applicator's on-board system or to an office system along with the other data recorded per batch.

Another embodiment of the present invention may also be used for accurate mixing of chemicals. This mixing station embodiment is especially useful for accurately blending seed treatments which often require small volumes of chemicals and sometimes as low as 15%-25% water. It may be provided in a stationery or transportable application. The transportable application provides means to collect field data. Each liquid input is preferably associated with an isolated conduit through which only that liquid is transported, a unique pump, and/or a unique flow meter. The low volumes typically used and the low volume of water or diluent required create a situation where separate conduits provide an advantage of eliminating the need to rinse after each addition. Alternatively, in mixtures having higher water volume, the isolation is not as important. In that situation a valve for each input moves the inputs into a manifold and into a single common conduit, a pump then moves the inputs through another valve to the recipient tank. Preferably, the pump and valve are then purged with water. This works especially well if water is the proportionally highest input by volume as it works as a rinse of the conduit.

The mixing station, while operating on the same general principle as the embodiment employed for large batch and seed dispensing, has been carefully tailored and designed for mixing where water/or diluent inclusion is minimal and the need for accuracy is high. The water needed in the mixture is carefully weighed in and then used as rinse water. The rinse water is recycled by a pump through the rinsing apparatus. The mixing station embodiment is preferably equipped with a container rinsing apparatus specifically designed to remove the typically sludge-textured chemical from its container and conserve water. The recipient tank is also preferably equipped with a water-conserving tank rinsing apparatus.

Where the requisite volume of mixture is larger than the recipient tank, the mixing station may be employed to provide a continuous sort of mixing apparatus. In this embodiment, the flow meter for each input would be specifically tailored for the input and then synchronized with the other flow meters for other inputs, including water to provide a constant proportional flow through the recipient tank to the conduit and pump on the tank's lower portion, followed by rinse water as allowed by the formula of the mixture. This approach creates a much faster process than measuring by weight into the recipient container and emptying the container multiple times. The scale in the recipient tank can be used to calibrate each flow meter independently and automatically.

Rinse water could also be pumped to the returnable bulk ingredient (e.g. chemical, fertilizer, lubricant, protectant) container once it's emptied or nearly emptied to clean it. A simple adjustment to create a closed circuit accomplishes this objective.

The mixing station may optionally include sensors to determine, upon rinse out, whether the rinse is complete. The sensors may be clarity sensors, chemical sensors, color sensors, pH sensors etc. and may be positioned at the exit point on the mixing station or any other point where the rinse has likely contacted the last most contaminated portion. Further, the preferred embodiment includes, in addition to a computer to operate the mixing station, wi-fi connection to an office computer or set such that an operator can remotely provide inputs and commands. Inputs may include many different specifics including field or area to be covered or seed units to be covered by a particular mix and appropriate rates; programming allows the mixing station CPU to determine how many batches will be required and whether a partial batch should be mixed to cover only as much as needed. Alternatively, operator could remotely order a batch of a particular name or formula to be mixed as needed. Reporting capabilities include batch reports with date, time, application rate, geography, etc. Grouping of batch reports according to crop, or destination or other criteria can be accomplished and printed as needed.

As the Environmental Protection Agency (EPA) continues to monitor agricultural chemicals and waste, and technological means of tracking increase, it is likely the EPA will increase its cradle-to-grave requisites for tracking. Tracking could easily include return of emptied containers with rinsing records and reports on the ultimate distribution of contents. The EPA will need to employ means to identify each container probably through RFID technology or other similar technologies. The mixing station includes RFID reading technology for reading and recording information to validate and identify the container, whether on a tag or chip associated with a container by the manufacturer or a chip associated with the container by the operator. This information may include data such as lot number, date of expiration, strength, and specific content information. The mixing station may be retrofitted with other means for reading and recording data associated with a container via label, chip, or other means. Preferably, a chip may be added to a coupler, specifically a dry break coupler on a bulk container and a mating coupler added to the station; upon connection the machine recognizes the coupler on the bulk container and the CPU records the material data programmed there. If those data are not appropriate for the mixture formula to be executed by the station, the computer will not operate thereby acting as a security measure against incorrect additions.

The mixing station's ability to accurately measure small amounts or with high accuracy or both will depend in part on calibration of the flow meters. Calibration for different viscosities is necessary. The scale is calibrated by adding a known weight, in this case five gallons of water measured accurately, in a measuring vessel is added to the recipient tank and the CPU calculated the correct calibration. If any flowmeters are present on the input of the recipient tank they can be calibrated automatically using the scale on the recipient tank. The flowmeters can be calibrated as often as each time they are used to verify the accuracy.

When using the mixing station to mix seed treatment all containers may be rinsed with the same premeasured, previously-weighed in amount of rinse water which, after the container(s) are rinsed, is added to the mix. For spray applications, it is best to rinse each container in sequence with addition of the container contents to the mixture. In other applications after all inputs have been added, then all containers are rinsed and then the rinse water is added to the mix. In each situation, the preferred embodiment includes a way to purge the remaining rinse from the system. Typically, air is forced through the conduit from the recipient tank to clear any remaining input.

A further modification would incorporate data provided by a source such as Greenbook Pro offered by The Greenbook Group® that has compiled data e.g. MSDS sheets, hazards, information on appropriate "tank partners" regarding chemical products. The data would then be available for reference in the field.

Other features include requiring a login per operator before the station will operate. This provides accountability. Auto calibration features, including for new valves, are provided and preferably are keyed from known specific water weight at the mixing station's location. Auto clearing of conduits is accomplished upon command from the CPU and employs air clearance. For mixes where each input must be separately added, the CPU will auto-clear the line between inputs.

The system may be equipped with a tilt sensor or sensors which allow the mixing station to correct for tilt as related to weight measurement. The station also employs safety features for operator safety. These features include latches the CPU monitors for closed/open status. For example, if the lid over the tank is not latched appropriately, the CPU will not allow the tank rinsing mechanism to operate.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED EMBODIMENT

Figure 1:
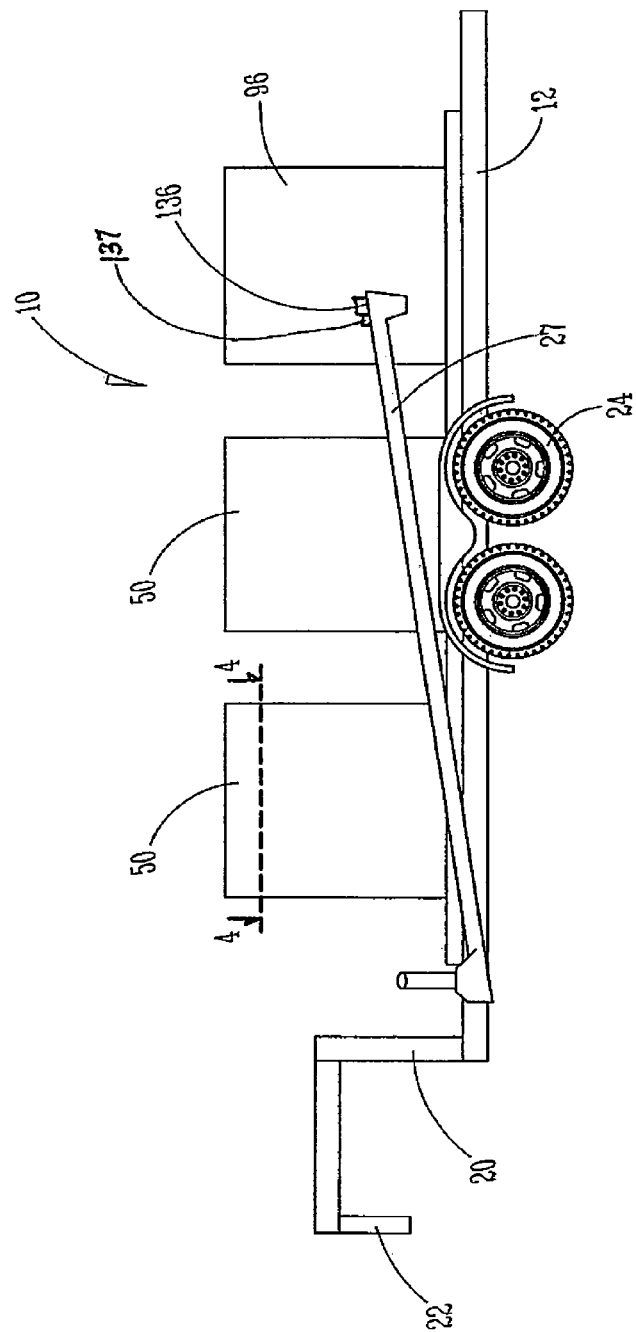
FIG. 1 is a side view of the input dispenser and recorder of the present invention used as a seed tender.
Figure 2:
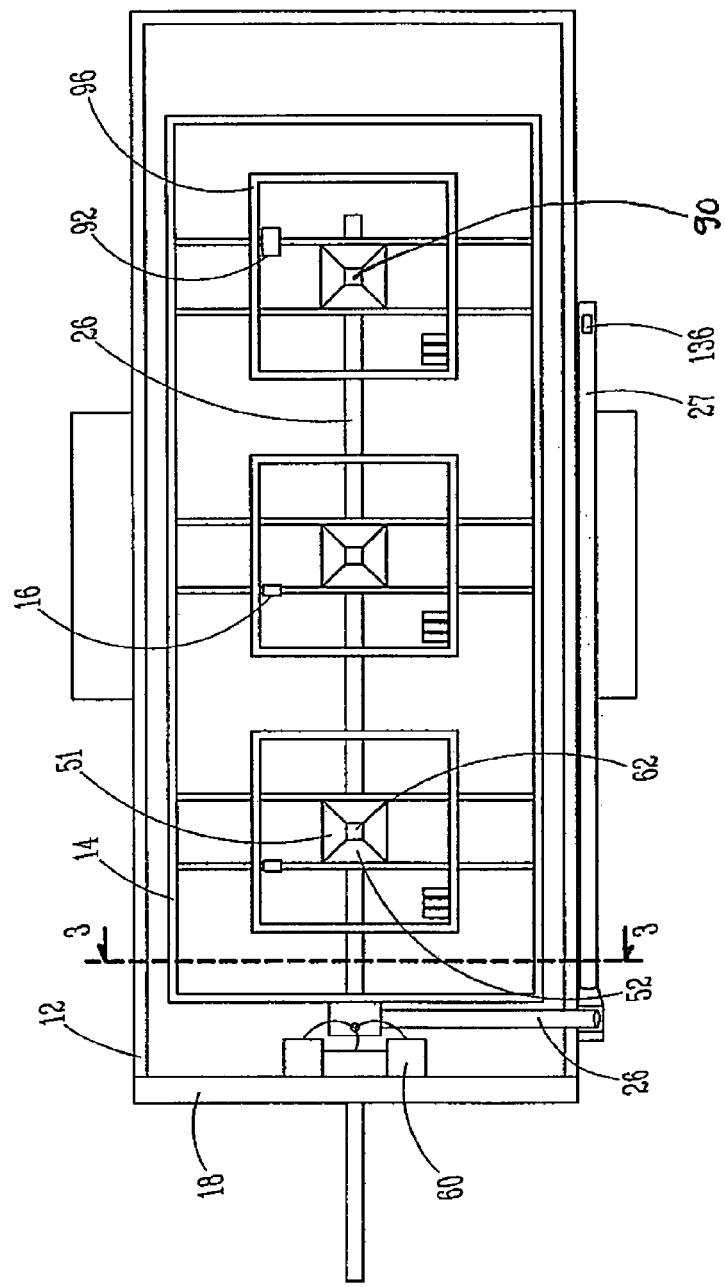
FIG. 2 is a plan view of the input dispenser and recorder of FIG. 1 without major input containers.

The present invention is an input dispenser and recorder 10 used to automate mixing predetermined ratios of desired inputs, dispense the mixture, and record such information as the time, date, amounts of each input used and the receiver of the inputs either by area and location or by herd identification. The recordation of the data facilitates inventory management, planning, and analysis when cross-loaded to other programs resident in systems on-board applicators or in office systems.

Specifically, the input dispenser and recorder 10 provides an arrangement that includes an outer frame 12 and an inner frame 14 moveably associated by a plurality of load bars 16. Said outer frame 12 of the preferred embodiment comprises an accessory bar 18 and, in the preferred embodiment, includes at least one hollow portion 20 used as an hydraulic fluid reservoir. The dispenser further comprises hitching means 22 and wheels 24 in order to allow for transportability. At least one major input container 50 having an opening 51 in fluid communication with first means to affect flow of input 62 and means to convey input 26 is associated with said inner frame 14. A tension-secured rail 200 pivotally attached to the outer frame locks said major input containers 50 in place.

Figure 14:
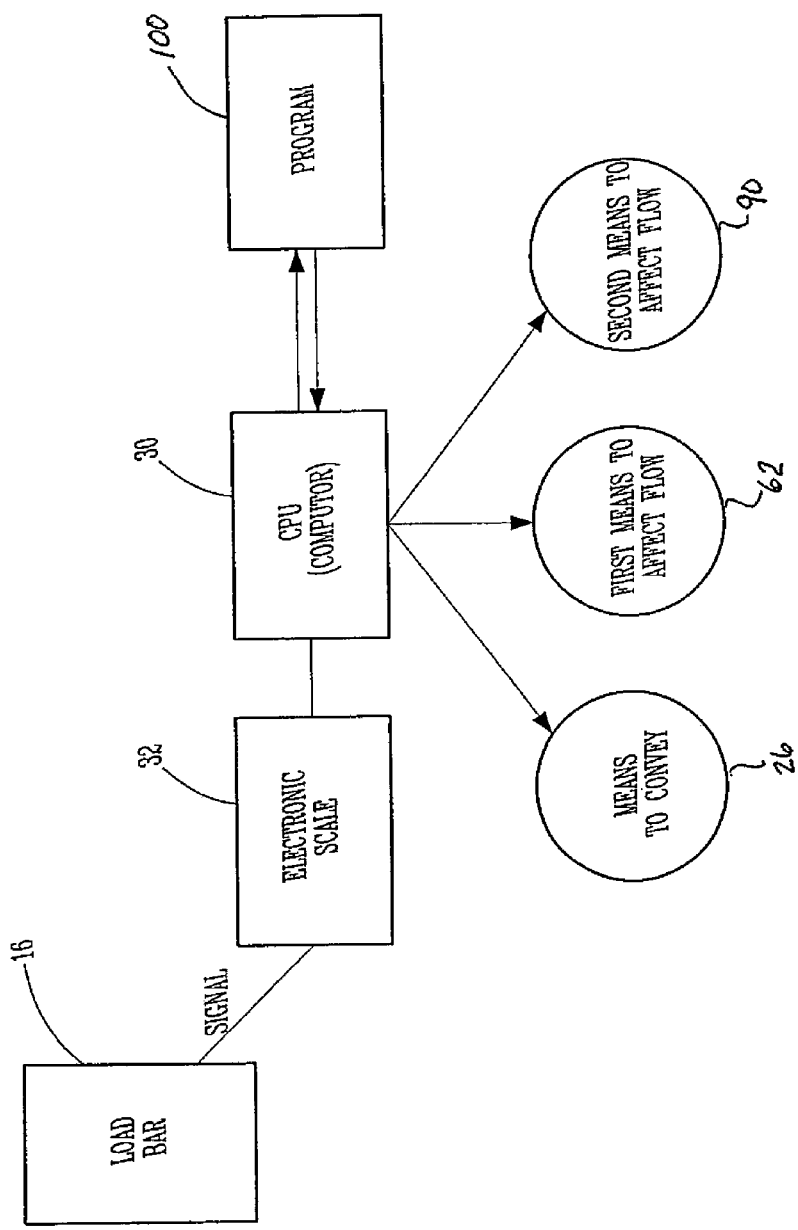
FIG. 14 is a schematic diagram showing the interface of the computer and various elements of a preferred embodiment of the input dispenser and recorder.

In a preferred embodiment, at least one minor input container 60 having an opening 61 in fluid communication with second means to affect flow 63 of input and means to convey 26 input is associated with said outer frame 12. (It should be noted that in certain embodiments to be described below, the relative size or volume of the minor containers to major containers are not relevant to the invention.) As shown in the schematic diagram of FIG. 14, a computer 30 and program 100 is interfaced with at least one electronic scale 32 associated with said plurality of load bars 16, said means to convey output 26, said first means to affect flow of input 62 and said second means to affect flow of input 63.

In use, the operator supplies at least one specific parameters 52 to the computer 30 by way of means to input data 53. Such means may comprise a key pad 53a, touch pad, data transfer media or hardware, or wireless communication from another source. The operator selects and activates a program 100 and supplies the requisite parameters 52. The program 100 then applies the parameters 52 and actuates means to convey input 26 to move inputs at a particular rate and to cause the required agitation and mixing. Said first 62 and said second 63 means to affect flow of input associated with an input container is separately controlled by said program 100 and coordinated with the rate of movement of input through said means to convey 26. By coordinating the flow and the means to convey 26, the program 100 creates the necessary physical action for the resulting mixture 40 required as well as the ratio of inputs one to another for the requisite final mixture 40. If desired, operation of means to affect flow of a minor input may be manually controlled while prompted and recorded by the CPU.

At the end of said means to convey 26, the mixed inputs are dispensed by a terminal conveyor 27 into a storage container (not shown) for use. For reasons to be described later, in an embodiment where liquid inputs are employed, the inputs are dispensed one at a time first to a recipient container 150 and then into a mixing tank 160 where means to stir 161 are provided. Said mixing tank 160 may be associated with either said inner frame 14 or said outer frame 12 or separate therefrom.

In an embodiment wherein a combination of dry and liquid inputs is used, it may be desirable to first dispense the mixed inputs from said means to convey 26 into a set tank 96 where means to vibrate 92 provide necessary agitation to provide more even application and better flowability upon final dispensing. The set tank 96 may be associated with either said inner frame 14 or said outer frame 12. The time for mixing or setting is monitored by the program 100, and when completed, said CPU 30 activates a third means to affect flow 90 so the mixture re-enters said means to convey 26 and is finally conveyed to the storage container 70.

The invention also contemplates a program 100 wherein the mixture 40 is dispensed to a plurality of receiving containers 70a of known volume (such as one planter box mounted above each row to be planted) rather than to a storage container 70. Here, the program 100 would provide for pre-programmed time delays such that after one of said plurality of receiving containers 70a is filled, a certain delay allows movement of the terminal conveyor 27 to the next container 70a and then automated dispensing of the appropriate weight or volume occurs and so on.

Means to convey inputs 26 may include any of a number of well-known conveyors for dry inputs. For example, belt conveyors, flighted augers, and brush augers may be used and each may provide certain advantages related to clean-out and speed. For dispensing seed, for example, inputs will be better mixed by flighted augers but clean out will be easier using belt conveyors. For liquid inputs, pumps, valves, and conduits will be the most commonly employed means to convey, however, it is not inconceivable that gravitationally advantageous placement of major and minor input containers could minimize the need for pumping liquids of low viscosity. Where inputs are both dry and liquid, the means to convey will be most dependent on the phase of the major inputs and may employ a combination of different means to convey in different parts of the input dispenser and recorder.

The embodiment shown in FIGS. 1-6 comprises an input dispenser/recorder used as an automated seed tender. The major input container 50 holds seed to be planted and sits on the inner frame 14. Input container 50 sits above a first opening into a hopper 52. A second opening is positioned at the bottom of the hopper 52. Means to affect flow 62 comprises a butterfly valve 62a. The butterfly valve 62a is in fluid communication with means to convey 26 and is controlled by the program 100 executed by the CPU 30. After parameters 52 are entered, the operator actuates the program 100; the program 100 records present weight 104 on the inner frame 14, turns on the means to convey 26, opens the butterfly valve 62a and begins to dispense the contents of the major input container 50. The program 100 monitors the change in weight 104 and determines when the appropriate amount of seed has been removed from the container 50. The means to convey 26 is allowed to run precisely as long as the program 100 has determined will be required to empty the means to convey 26 and the desired amount of seed is entirely dispensed into the storage container 70. If said means to convey 26 comprises an auger 26a having flighting 26b, a motor 136 associated with the auger 26a is equipped with a sensor 137 to sense a change in torque as it empties. The motor 136 lowers the auger flighting within the auger housing to move remaining seed out, and then returns the auger flighting 26b to its normal operating position when finished.

Figure 3:
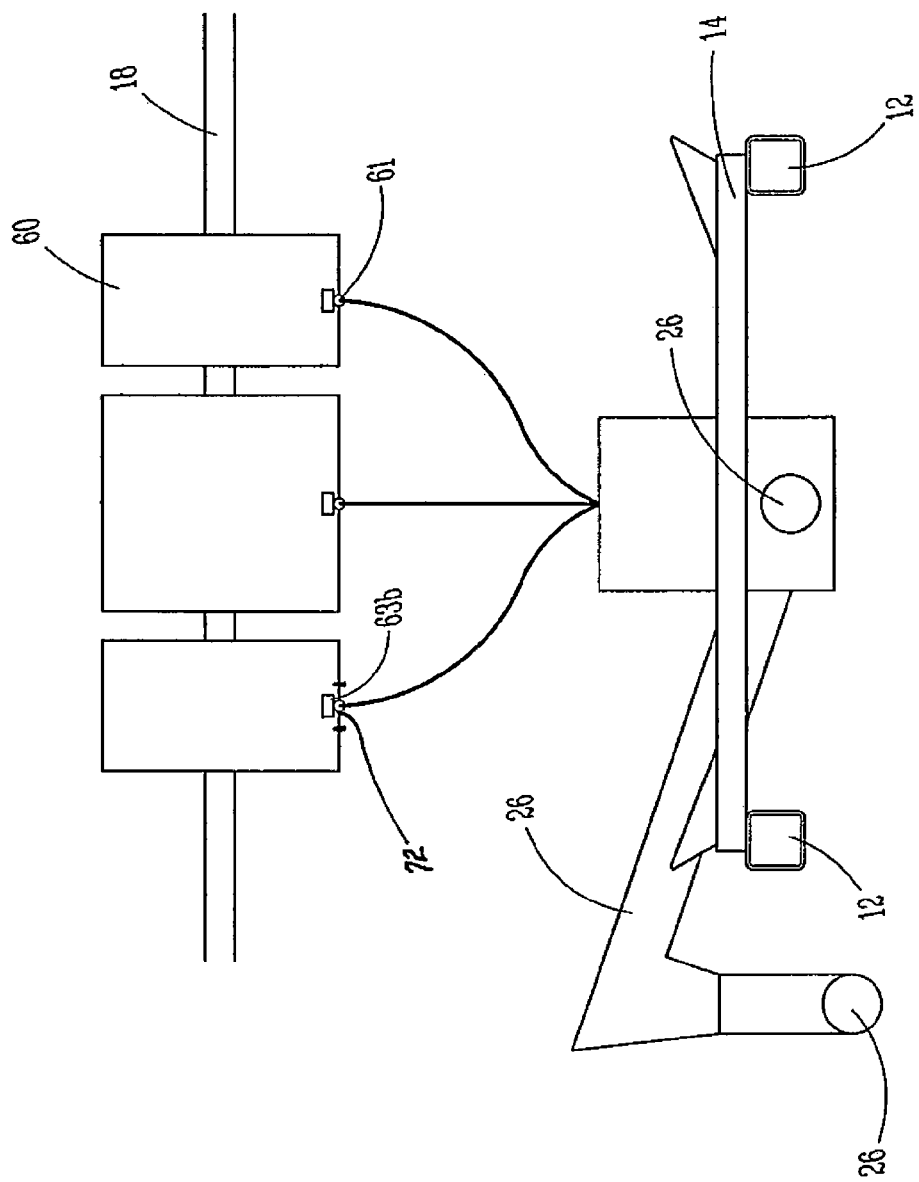
FIG. 3 is a perspective close up along line 3-3 in FIG. 2 showing the minor containers in fluid communication with means to convey.
Figure 4:
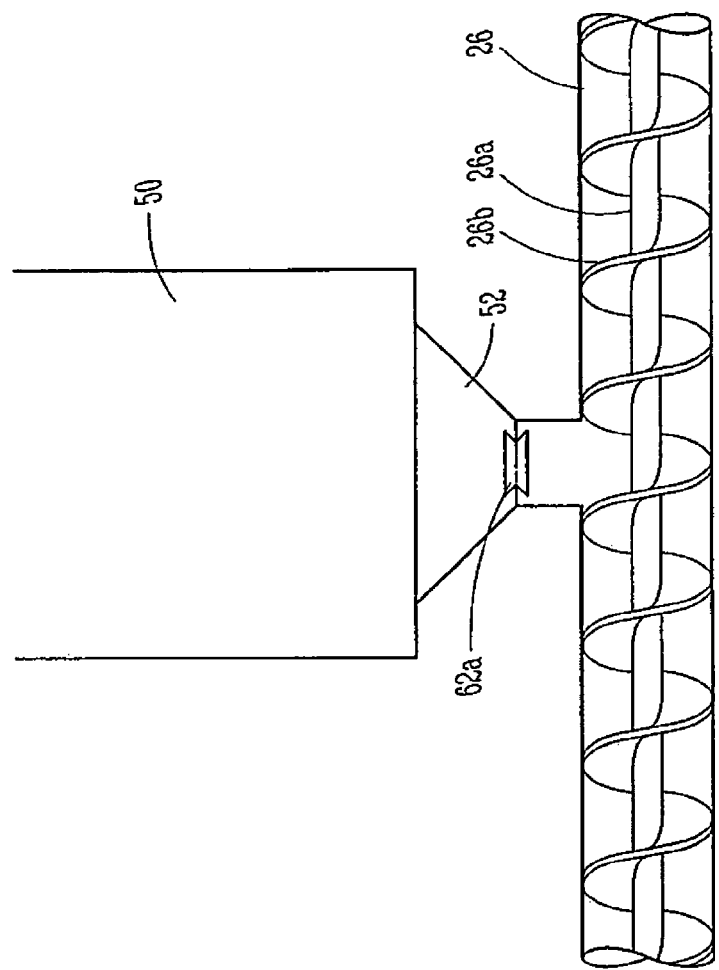
FIG. 4 is a cut away of a major container of FIG. 1 along line 4-4 of means to convey inputs and means to effect flow of an input of one embodiment of a preferred embodiment.
Figure 5:
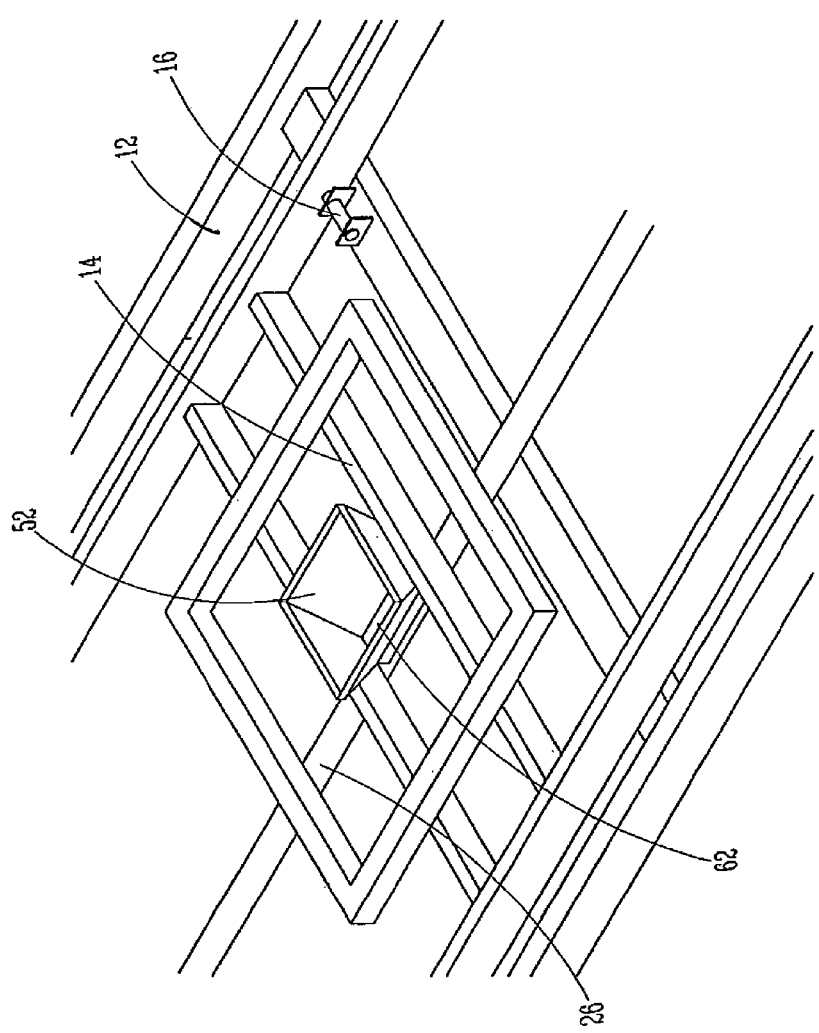
FIG. 5 is a close up perspective showing the inner and outer frames, and the hopper without a major container installed.
Figure 6:
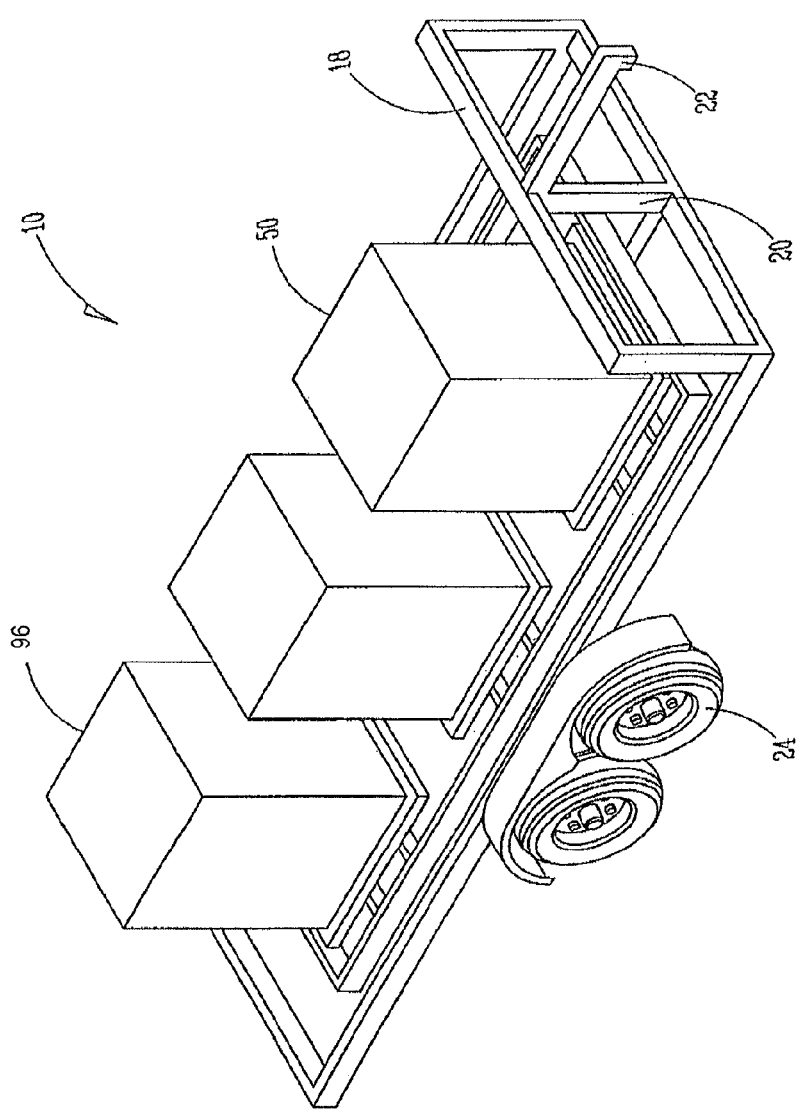
FIG. 6 is another perspective showing another angle of the invention shown in FIG. 1.

When used as a seed dispenser, the accessory bar 18 may have a plurality of minor input containers 60 mounted on it wherein each contains a particular seed treatment. As best seen in FIG. 3, each said container 60 comprises an orifice 72 with a flow meter 63b as second means to effect flow 63. Alternatively, other embodiments may employ a metering pump or other means to affect flow including a manual actuator. Said flow meter 63b is controlled by the CPU 30 and is in fluid communication with said means to convey 26. If the program 100 requires certain ratios of seed treatment to seed, the program 100 will actuate means to convey 26 and simultaneously control the butterfly valve 62a in the hopper 52 and each of said flow meters 63a in each of said containers 60 separately in order to affect the appropriate ratios. Specifically the rate of flow of each seed treatment will be separately dictated relative to the flow of the other seed treatments and to the rate at which seed is conveyed. In addition, the speed of said means to convey 26 may be varied to facilitate appropriate mixing. In the seed tender embodiment, a series of connected flight augers 26a is used as the means to convey 26 seed and seed treatments.

If dry and liquid inputs are used together, the set tank 96 receives the treated seed. Upon entry of the first treated seeds, means to vibrate 92 the set tank 96 is activated by the CPU 30 and continues until the pre-programmed time has elapsed. At that time, the computer 30 may convey the set seed through additional means to convey 26 to a storage container 70 or it may wait for further operator input.

Figure 7:
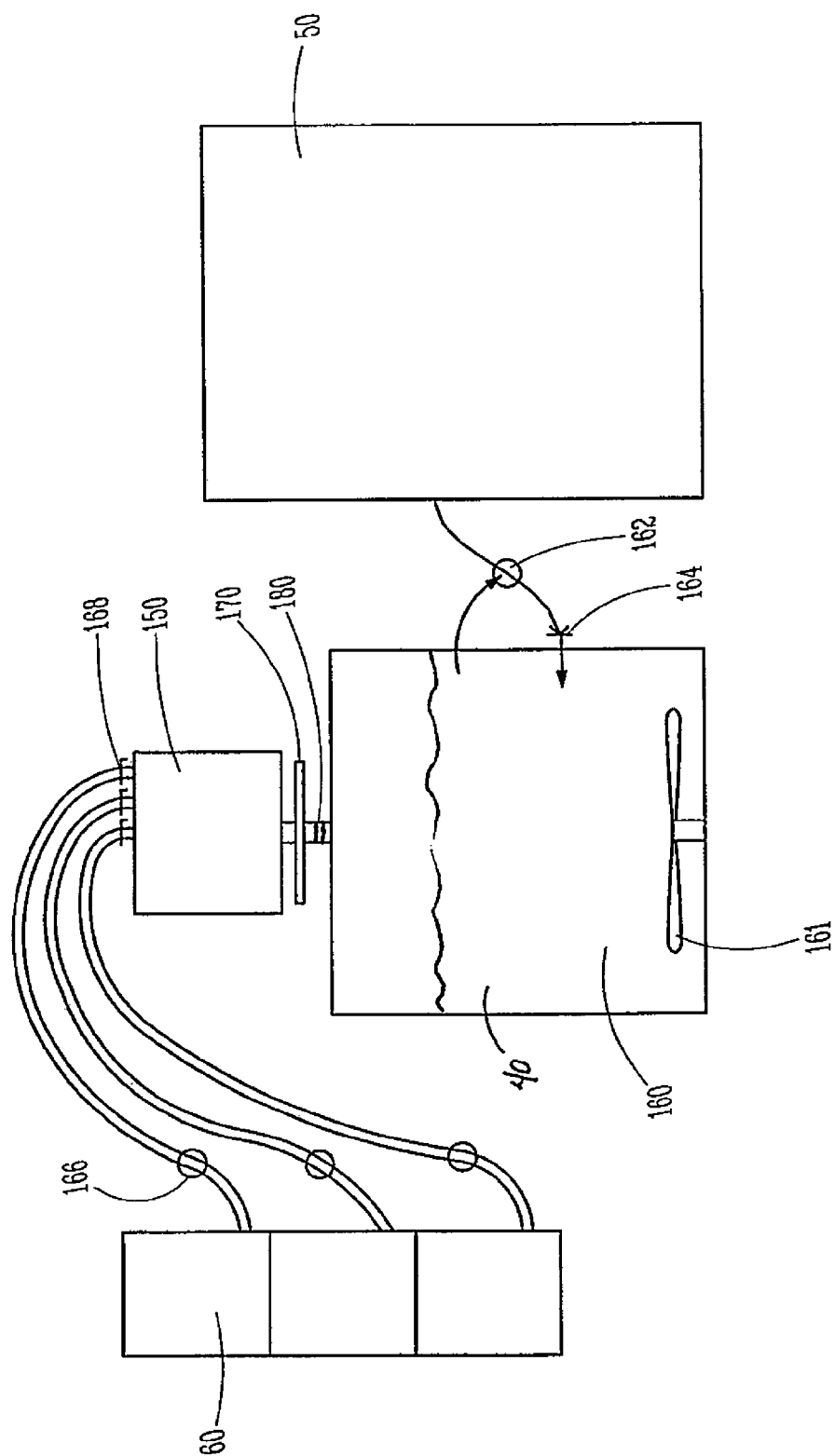
FIG. 7 is a side view of means to convey minor inputs to a receiving container of a second embodiment of the present invention.
Figure 8:
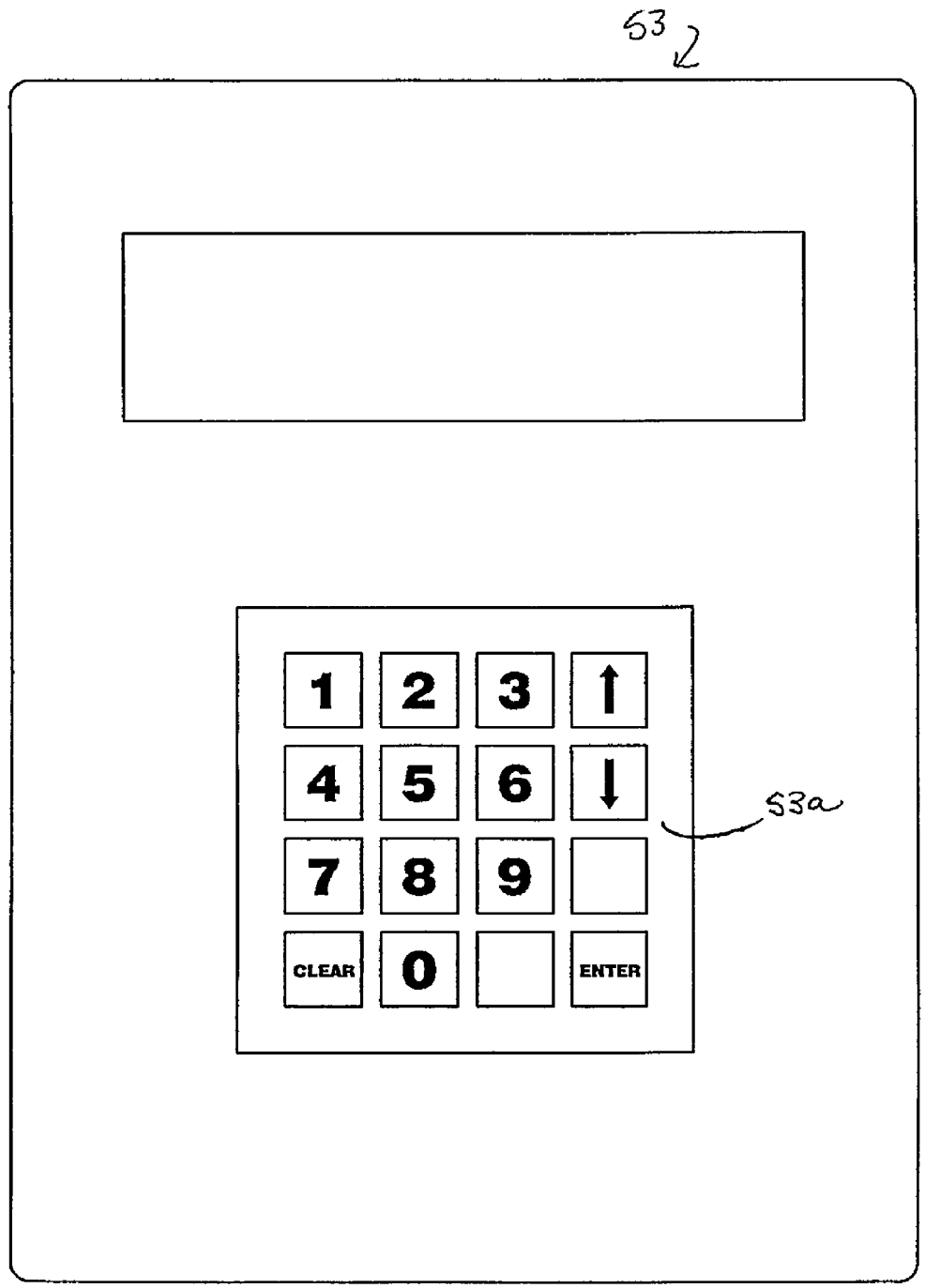
FIG. 8 is a close up view of the means to input data into the input dispenser and recorder.
Figure 9:
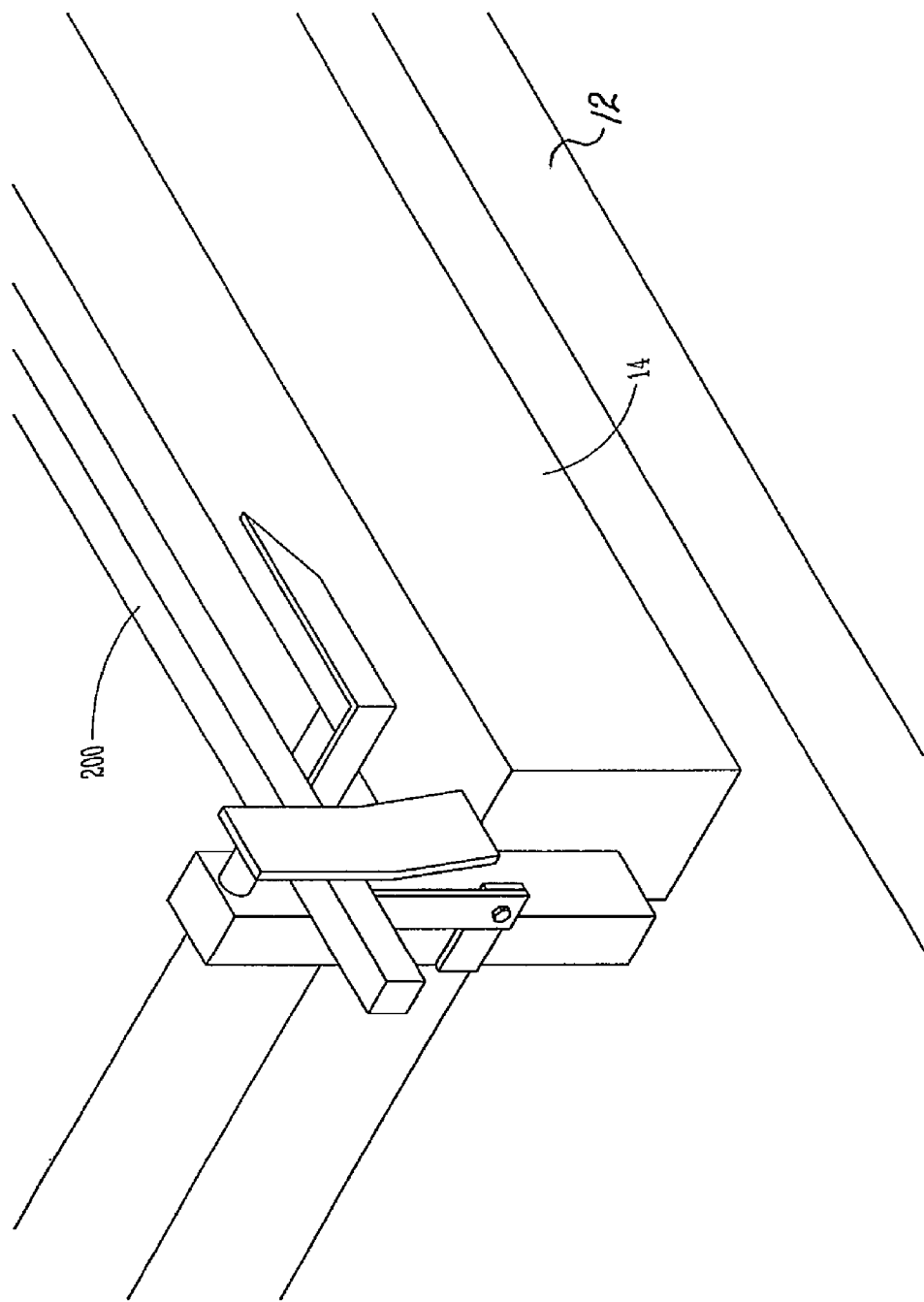
FIG. 9 is a perspective of FIG. 1 showing the tension-secured rail in closed position.
Figure 10:
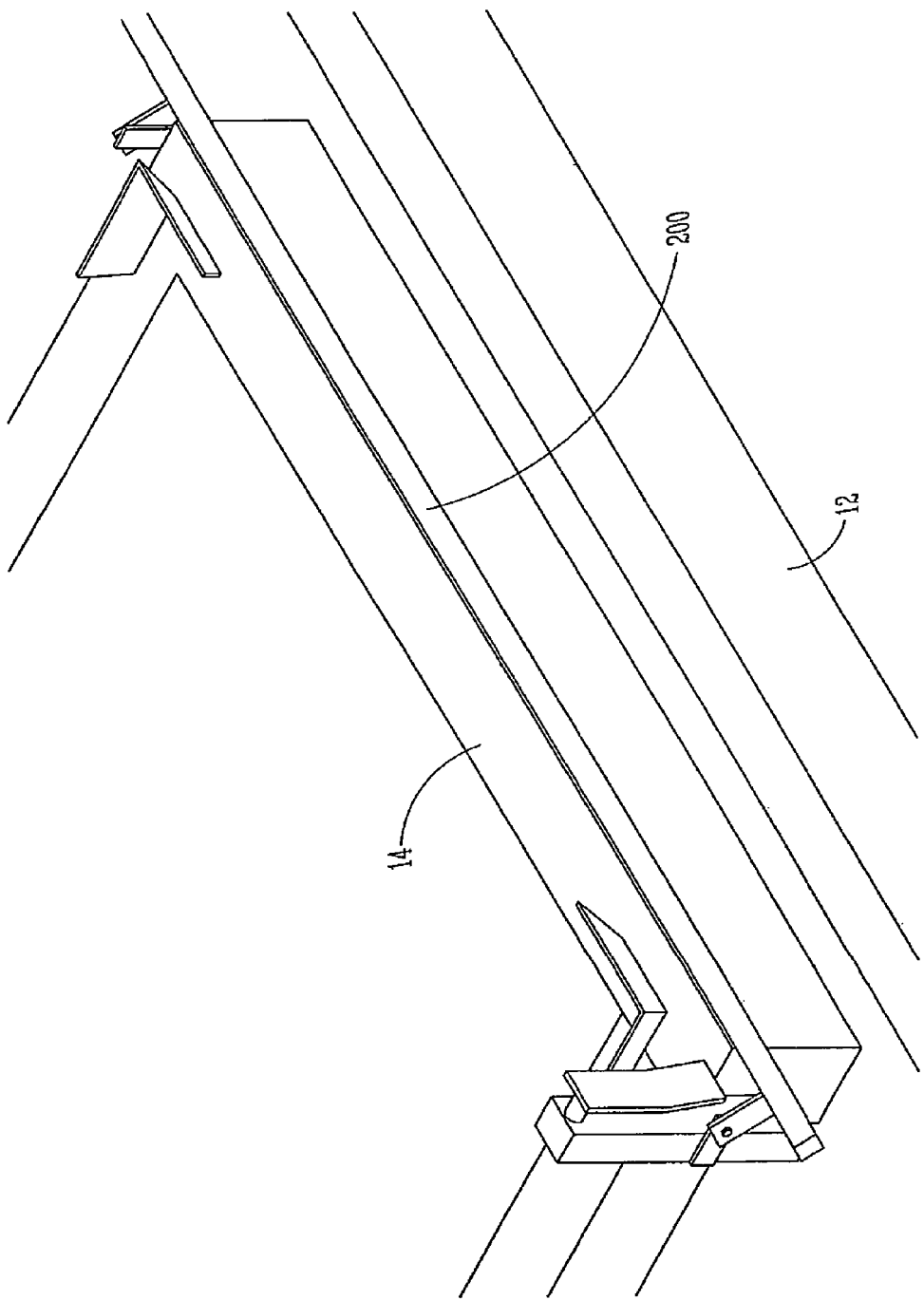
FIG. 10 is a perspective of FIG. 1 showing the tension-secured rail in open position.
Figure 11:
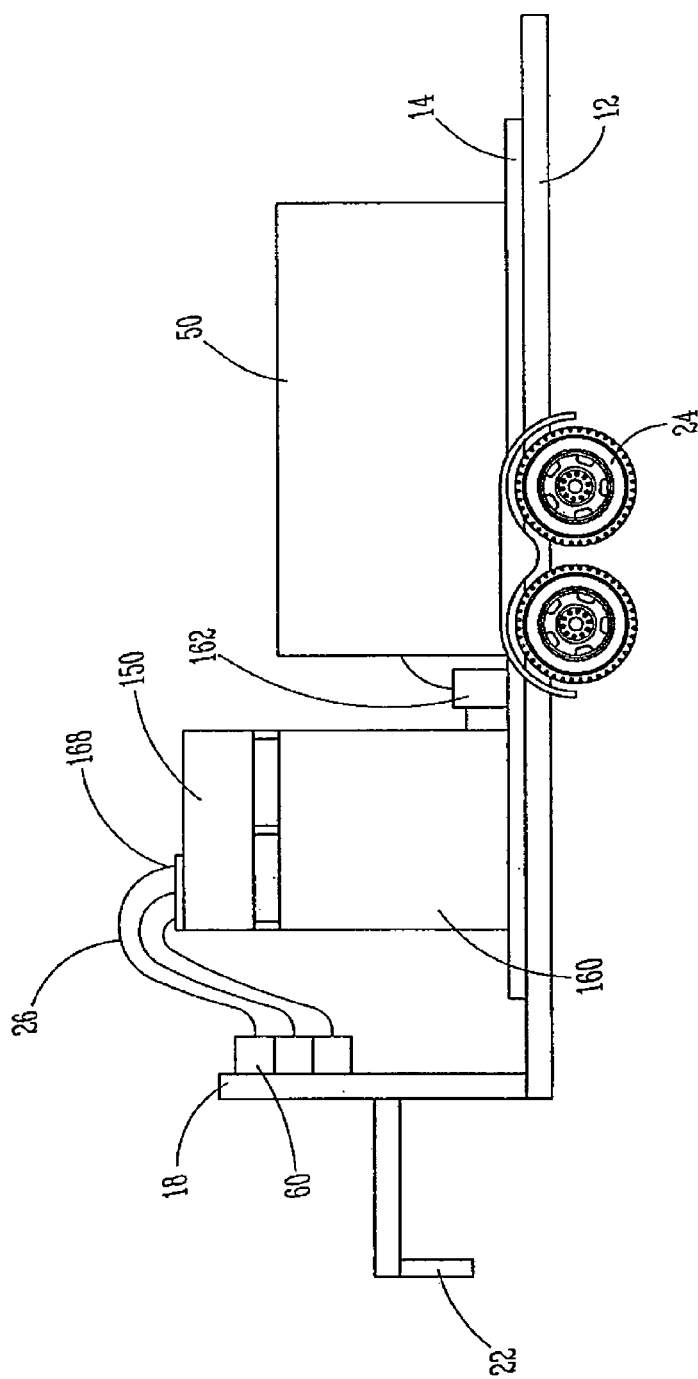
FIG. 11 shows a side view of an embodiment of the present invention used for liquids.
Figure 12:
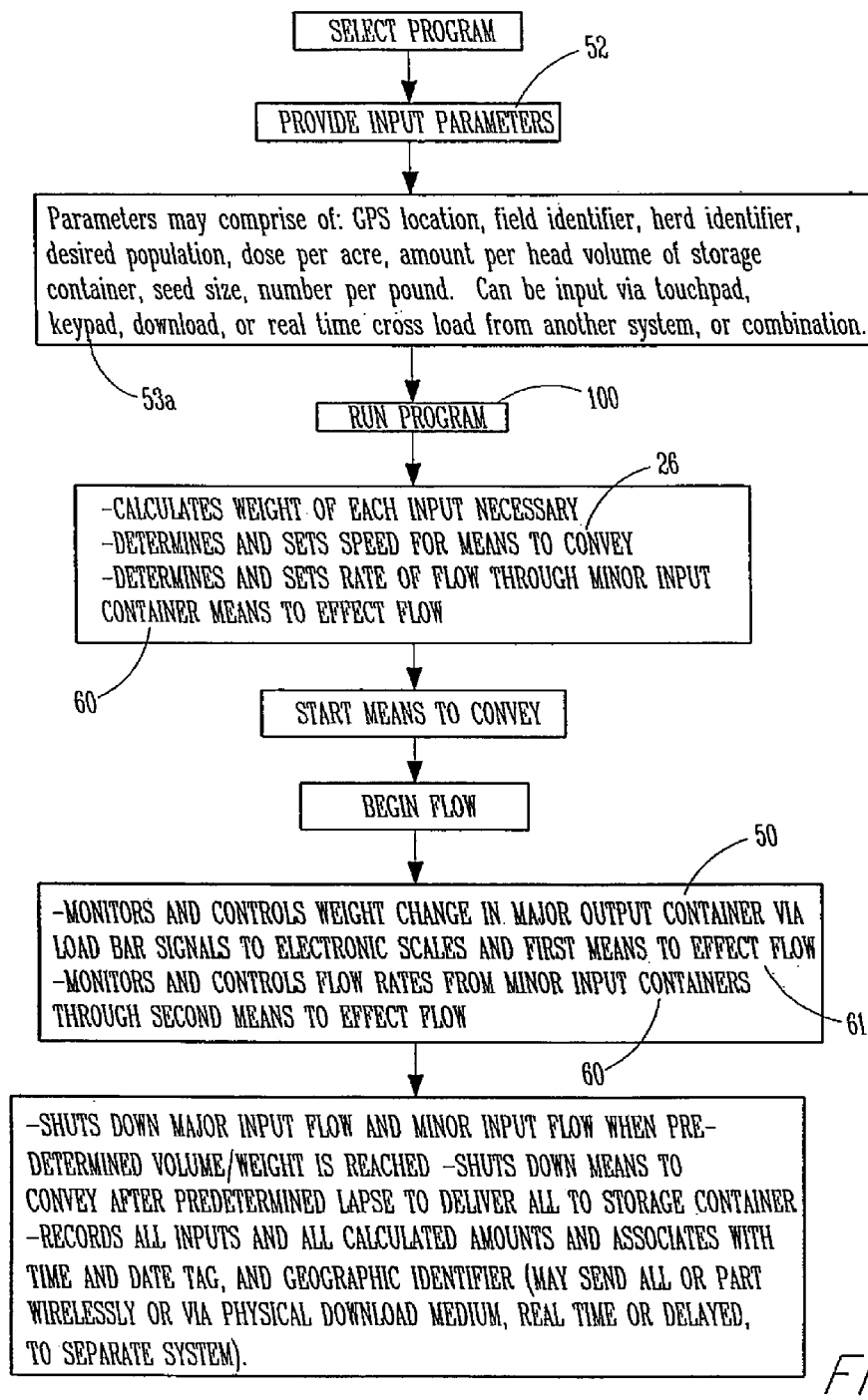
FIG. 12 shows a software program to effect appropriate mixing and dispensing for dry inputs.
Figure 13:
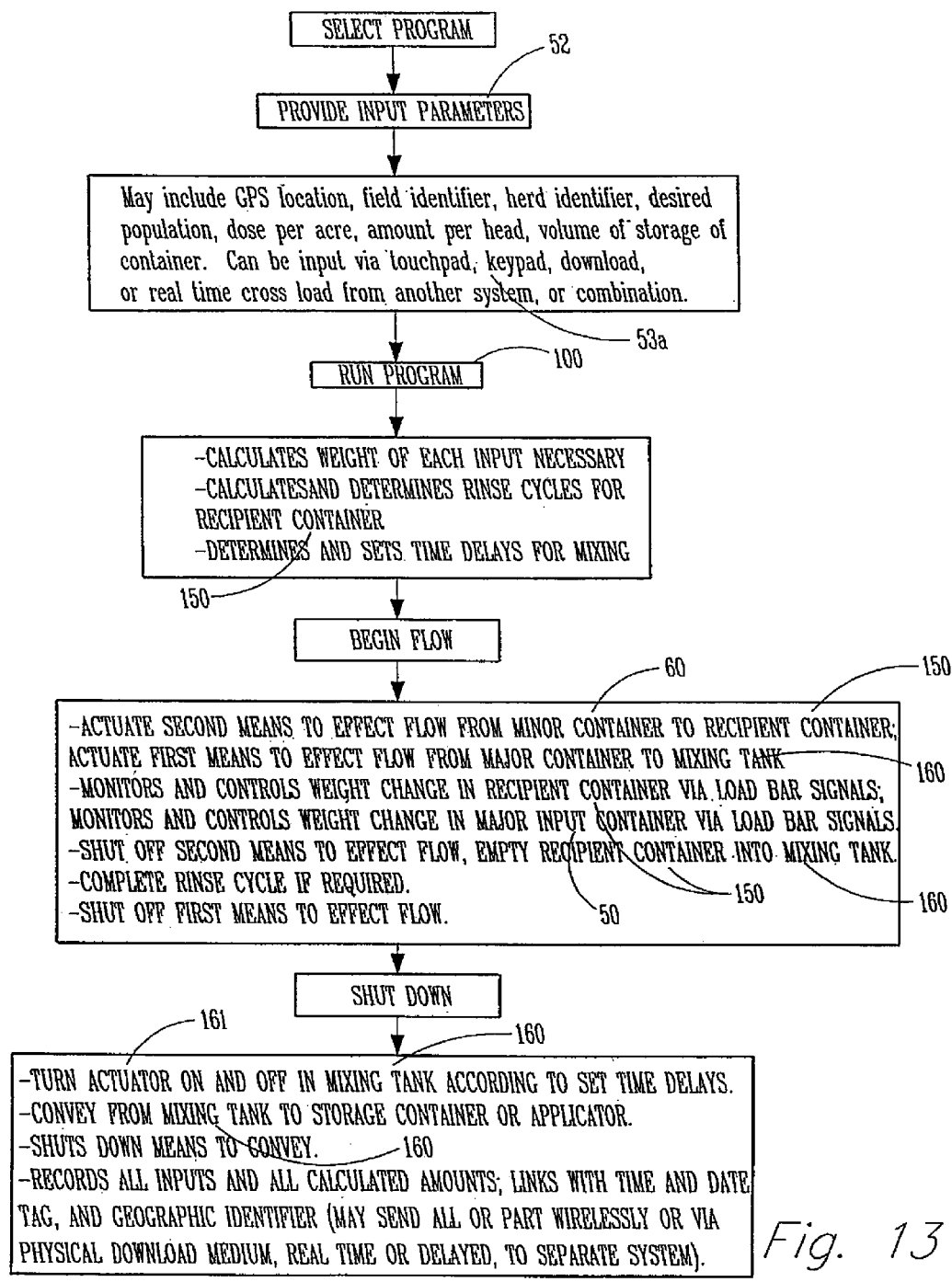
FIG. 13 shows a software program to effect appropriate mixing and dispensing for liquid inputs.

The terminal conveyor 27 is the final conduit through which the mixture 40 passes. In the seed tender embodiment, the position of terminal conveyor 27 can be controlled by the computer 30 through electric solenoid valves 95 and hydraulic cylinders such that it can be folded nearly parallel with the outer frame 12 for transportation, but unfolded to a desired position for dispensing mixed inputs. This feature provides a higher level of safety for the operator and during transport in addition to adding to the efficiency of the operative steps.

Where the resulting mixture 40 is in a liquid phase as shown in FIG. 7, the dispenser 10 further comprises a recipient container 150. The storage container 70 may be replaced by a mixing tank 160. Once again, the flow of inputs and relative amounts thereof are controlled by the CPU 30 as it applies the selected program. The recipient container 150 is associated with an electronic scale 170. In this embodiment, the major container 50 typically holds a diluent. Means to convey 26 fluidly associates the major container 50 and the mixing tank 160 through a pump 162 and valve 164. In one modification, the mixing tank 160 and major container 50 are connected via a circulating pump. The addition of diluent may be monitored by a flow meter, rather than by weight. Mixing the inputs may be effected by recirculation through the circulating pump 162 or an agitator 161.

In the preferred embodiment for liquid applications, said second means to affect flow comprises a valve and means to convey comprises a conduit and a pump. Each of the other fluid inputs are held in a separate minor container 60 wherein said minor container 60 is fluidly connected to said recipient container 150 by means to convey 26 and a pump 166 and valve 168 comprises said second means to affect flow. Here, each input is separately dispensed into the recipient tank 150 by the computer 30 until the requisite weight required by the program 100 is detected. Then, the computer 30 activates a dumping mechanism 180 and the input in one recipient tank 150 empties into said mixing tank 160. These steps are repeated for each input. The specific amounts and order of addition of each input and the diluent is dictated by the program 100. Alternatively, in mixtures having higher water volume, the isolation of inputs is not as important. In that situation a valve 168 for each input 60 container effects flow of the input into a manifold, single conduit with other inputs. The manifold is fluidly connected to a single pump 166 which moves the combined inputs to the recipient container 150. This works especially well if water is the proportionally highest input by volume as the water works as a rinse of the conduit.

The preferred embodiment includes a pump 162, a circulating pump whereby the recipient tank 150 may be rinsed by a small amount of diluent from said major input container 50 each time after the recipient tank 150 is emptied into said mixing tank 160. Further, said mixing tank 160 includes said agitator 161 actuated by the computer 30 according to predetermined time delays dictated by the program 100.

In another modification, the CPU 30 applies the program 100 and tells the operator which of the minor inputs needs to be added manually, when to add it, and how much to add. Here, the addition may be to the mixing tank or to the recipient container. This modification is especially useful for the situation where the amount of a minor input is small enough that its addition by weight may not be accurate based on the level of error of the scale employed. Once a minor input is added, the operator provides input to the computer to confirm its addition.

In yet a further modification, the dispenser and recorder is permanently located and comprises a recipient tank, a computer and program and having means to receive data and to send data, a major input container with means to convey said major input to said recipient tank wherein said means to convey is controlled by said computer, and an electronic scales associated with the recipient tank and with the computer. This modified version can be used such that the recipient tank is a re-usable chemical container and to operate as a dispensing station for chemicals. In the preferred version, each reusable chemical container has an electronic identifier whereby upon filling the re-usable container to the amount dictated by the program, the identifier, contents, and amount is recorded and sent to an inventory management system.

After the liquid mixture is adequately mixed, it will be conveyed to an applicator through a flow meter. A record of the mixture, conditions, time and date, location, and volume will be made and transferred as necessary to other systems as described herein.

When applying herbicides and pesticides certain conditions dictate alterations in the basic mixture ratios. For example, dry hot conditions will dictate more chemicals to be sprayed per acre. Early morning or evening application typically requires higher concentration of chemicals because the plants are not as active and will not uptake the chemicals at the same rate as they would later in the day. If weeds are at a four inch height the required amount of herbicide will differ from that required if weeds are six inch height. Further, a drift retardant can be added in applications to be sprayed. The amount of drift retardant required depends on the wind speed. There are wind speeds at which a drift retardant will not suffice and the mixture should not be applied. The program used by the CPU may be written to require input of conditions and then apply an algorithm to produce the mixture best suited to the conditions. The conditions can be supplied manually or via electronic means including local placement of detectors on the dispenser/recorder or downloading information from any of a variety of local atmospheric monitoring services. The program can even be written to warn an operator that conditions are suboptimal for application at all.

Each of the embodiments described above includes the ability to receive data in the form of work orders and then apply that data to the selected program to complete the order.

An additional embodiment is employed as a computer-aided batch input dispenser and is illustrated in FIGS. 15 through 19. This embodiment's purpose is to assist in mixing batches where the water component of the mix is low, viscosities of the inputs are relatively high, and accuracy is of paramount importance. Further, the embodiment includes elements to allow addition of inputs in order and in substantial isolation from one another.

Figure 15:
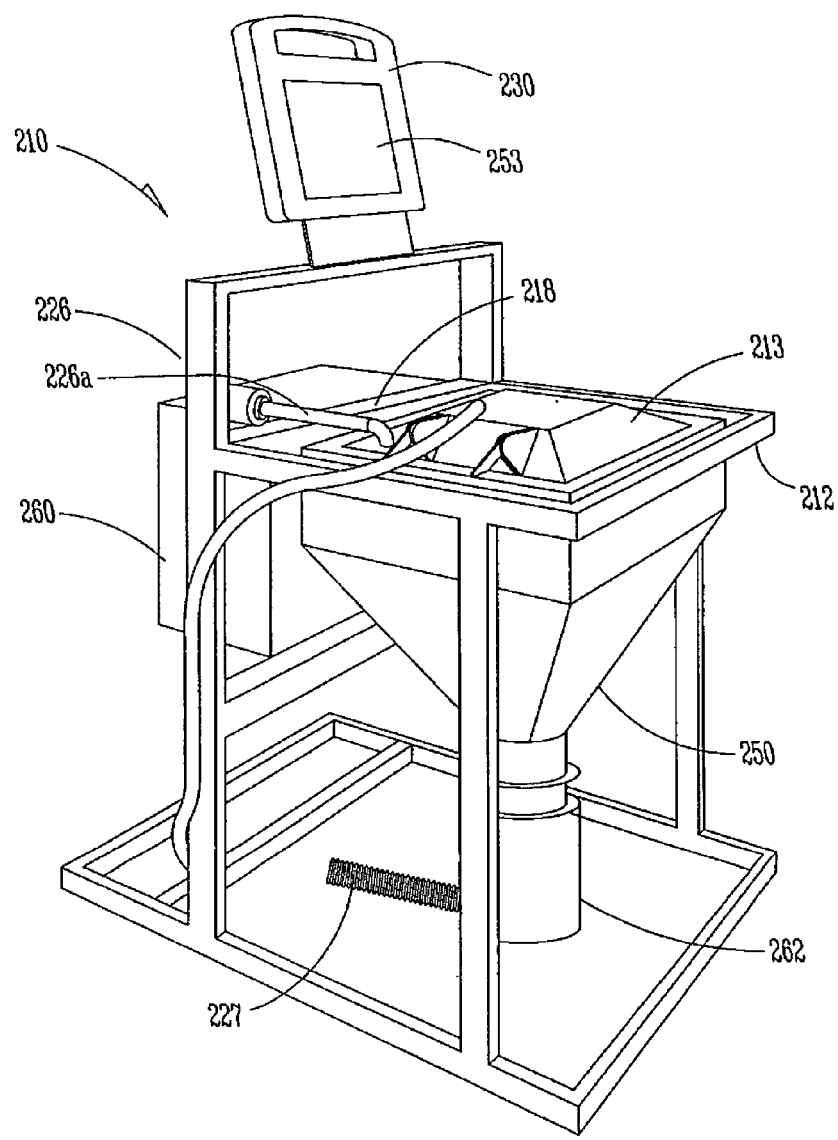
FIG. 15 is a perspective side view of another preferred embodiment, the mixing station of the present invention.
Figure 16:
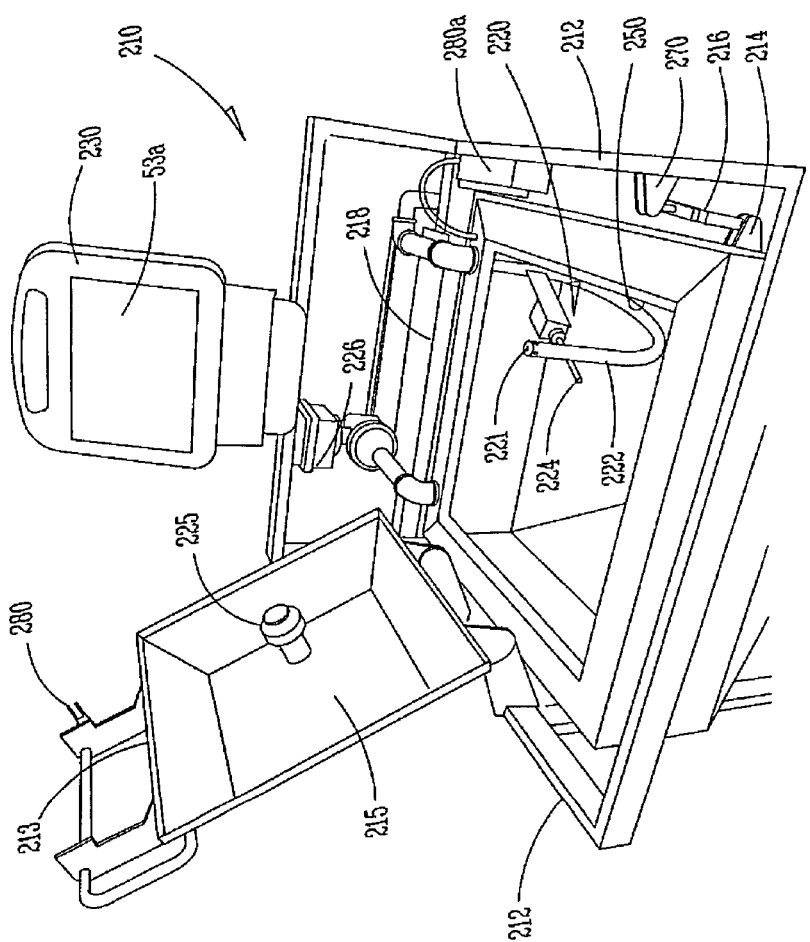
FIG. 16 is a perspective view of the mixing station of FIG. 15 with an open lid.
Figure 17:
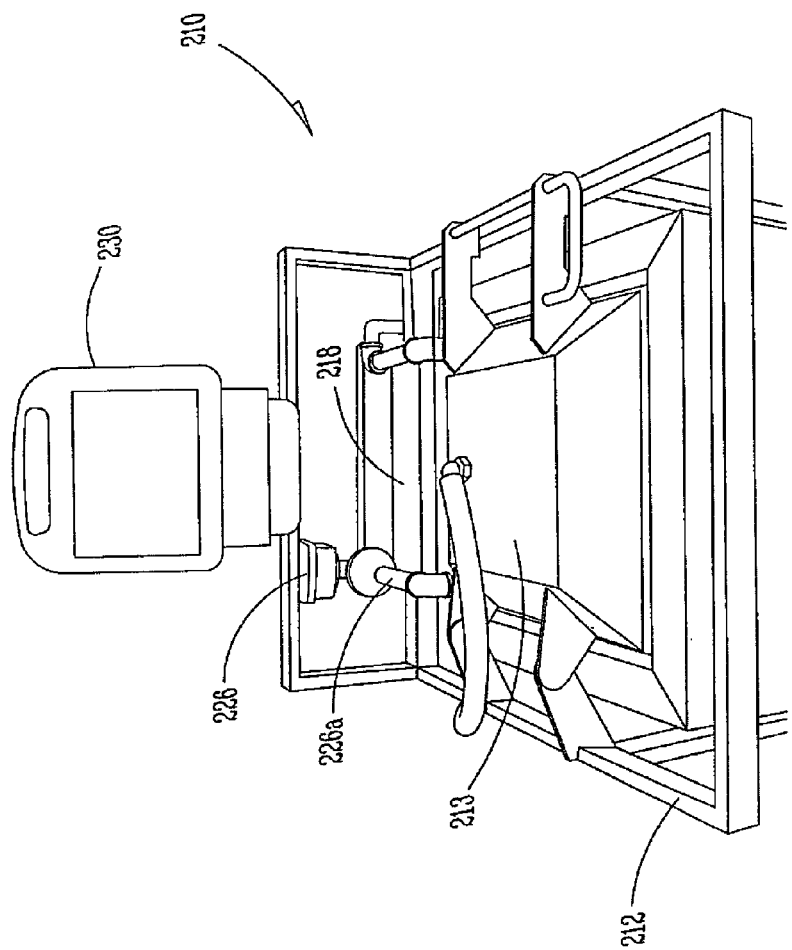
FIG. 17 is a perspective view of the mixing station of FIG. 15 with a closed lid.
Figure 18:
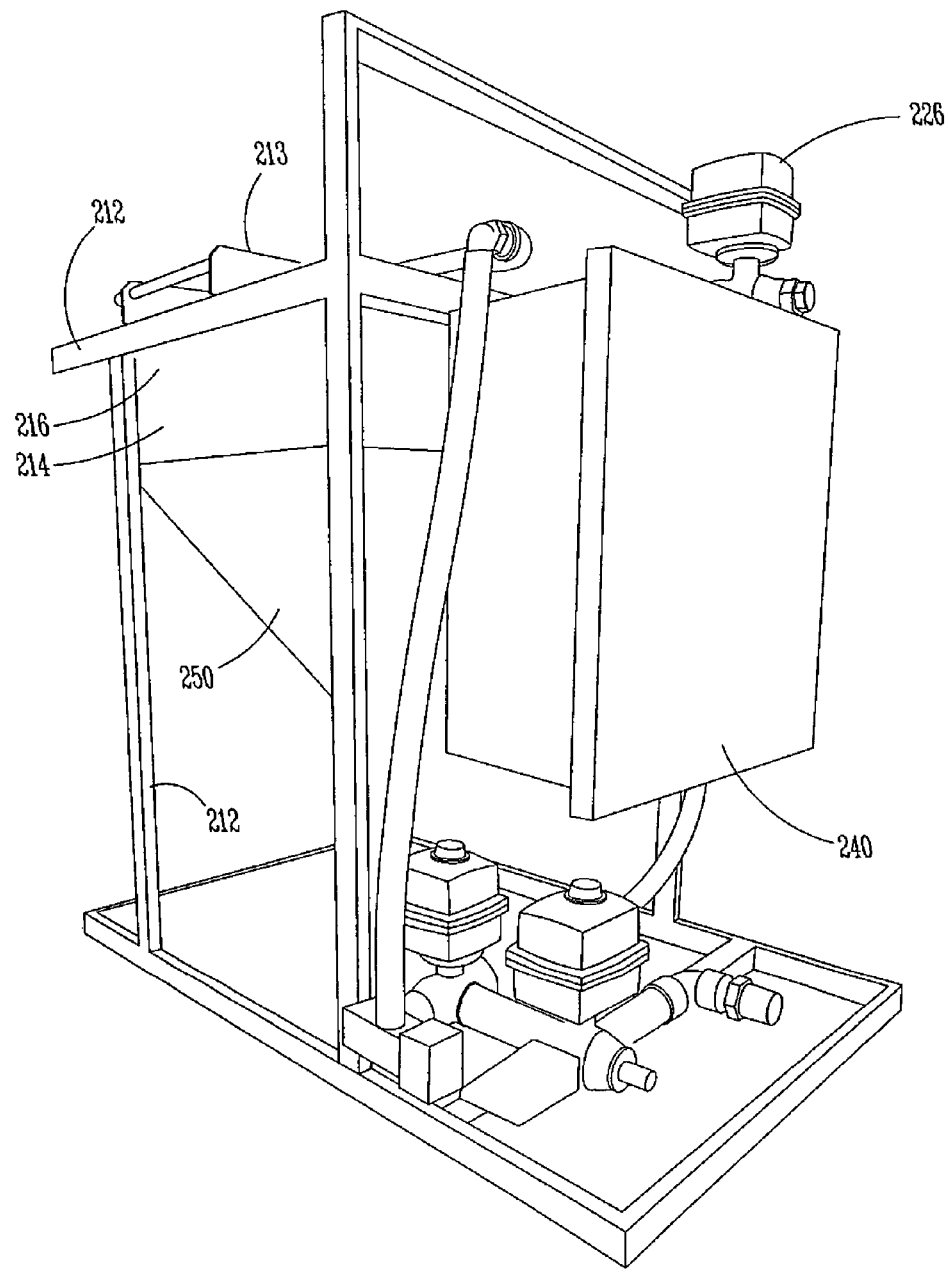
FIG. 18 is a perspective view of a back side of the mixing station of FIG. 15 showing a closed control box.
Figure 19:
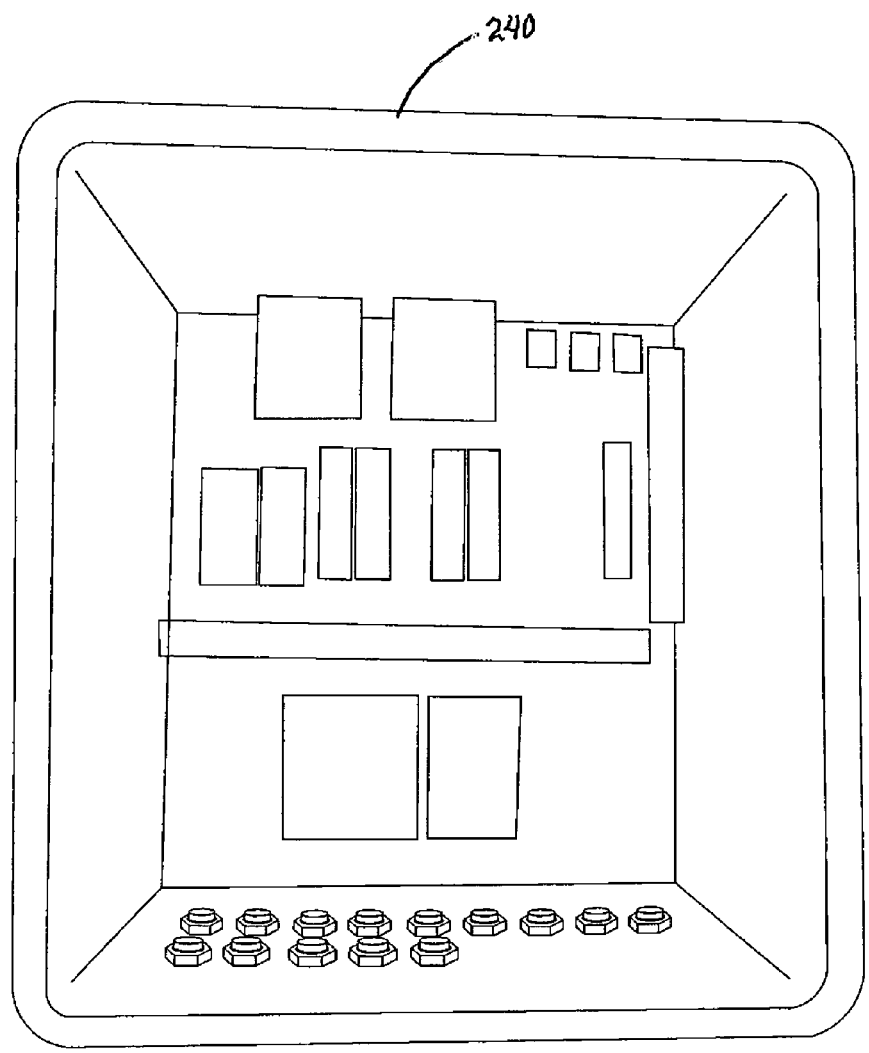
FIG. 19 is a perspective view of the back side of the mixing station of FIG. 15 showing an open control box.
Figure 20:
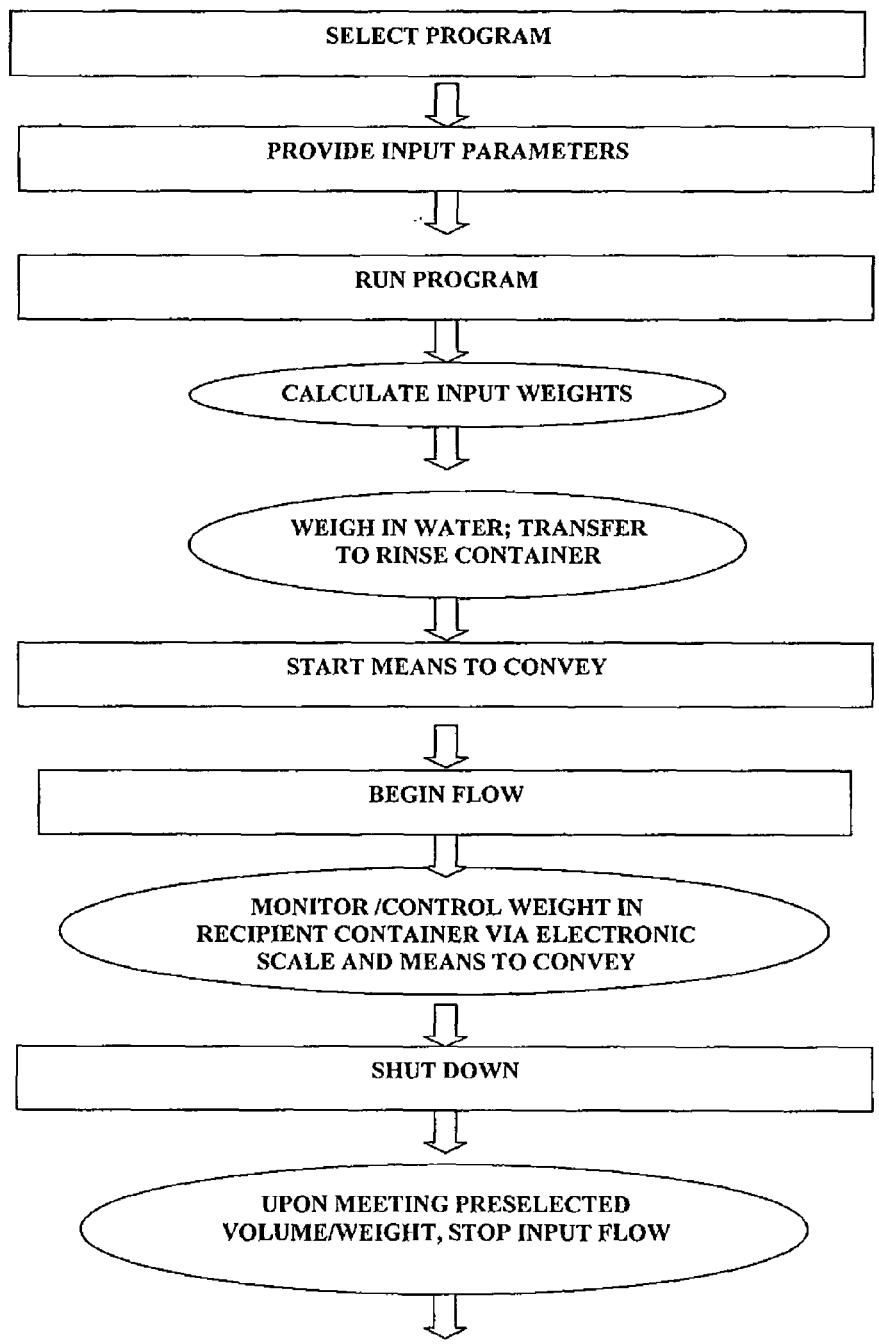
FIG. 20 is a schematic of a program for weighed input addition.
Figure 20:
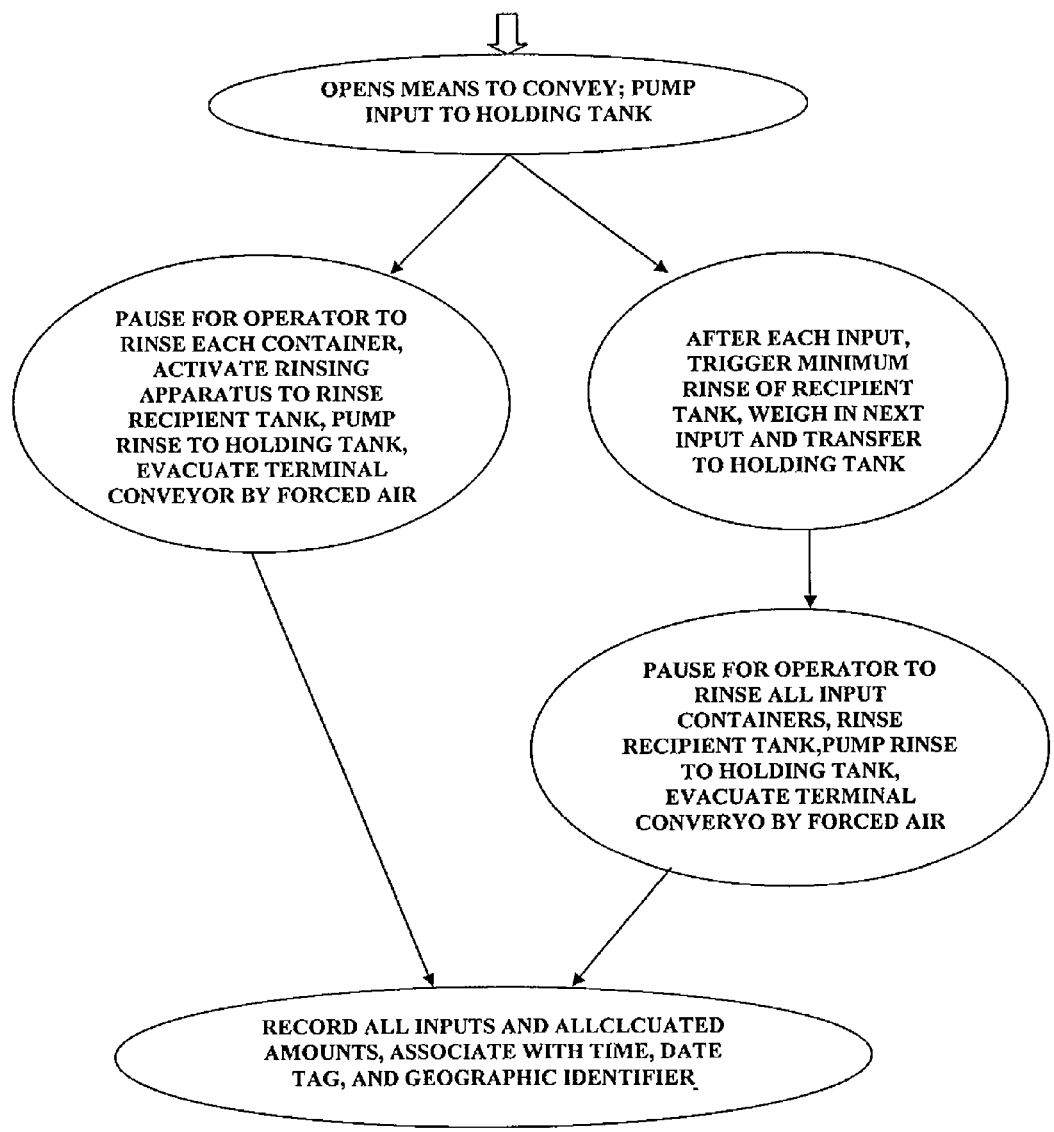
Figure 21:
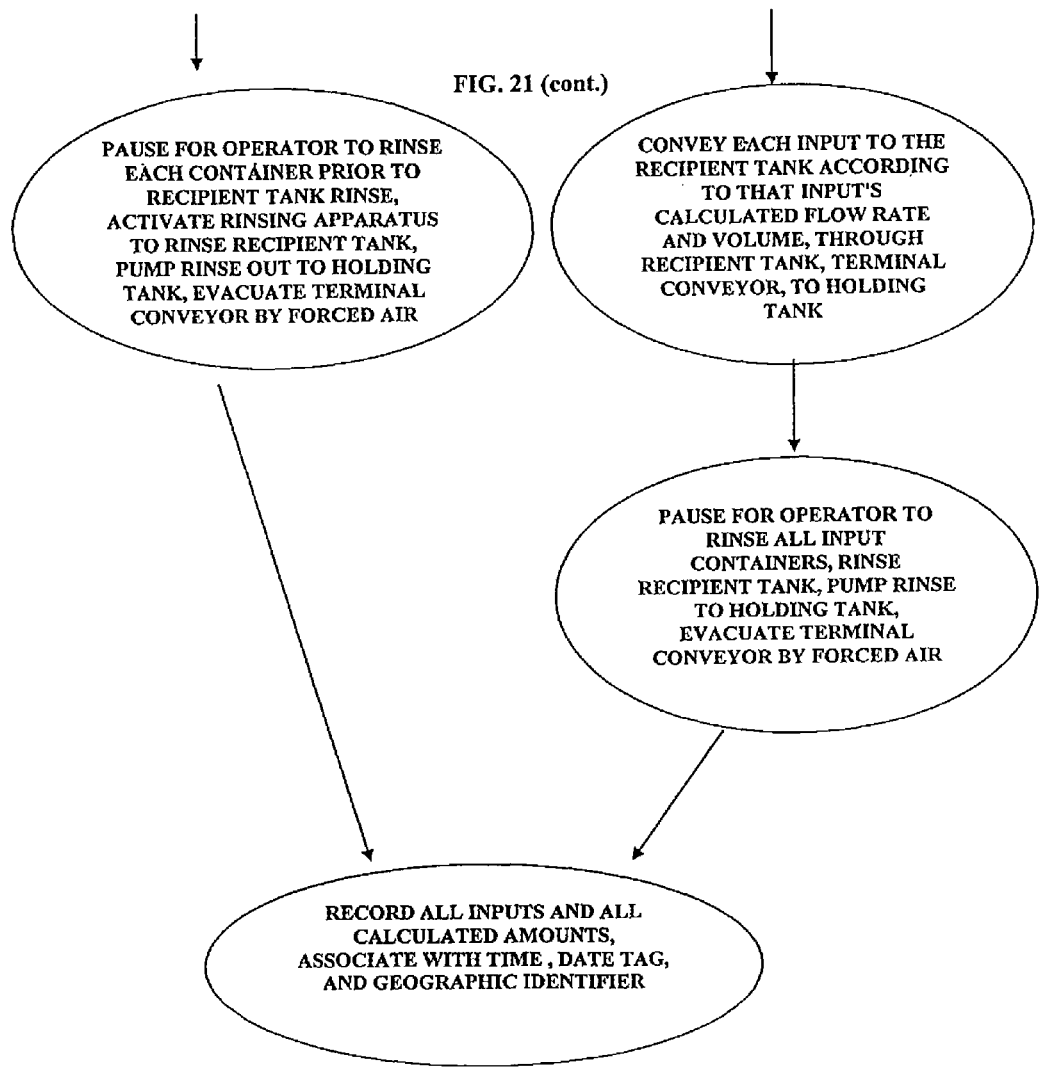
FIG. 21 is a schematic of a program for continuous flow input addition.

Referring now to FIGS. 15, 16 and 17, the computer-aided batch dispenser 210 includes an outer frame 212 and an inner frame 214, at least one minor input container 260 having an opening 261 associated with means to affect flow 263 and means to convey 226. Means to convey 226 preferably includes a pump 226 and a conduit 226a. Means to affect flow 263 often includes a flow meter and/or a valve. For each input container, a unique means to convey is provided thereby eliminating need to rinse the means to convey between each input and conserving water requirements for rinsing. Means to convey 226 are associated with an accessory bar 218. A recipient container or tank 250 is associated with the inner frame 214. The means to convey 226 conveys an input 260a from the input container 260 to the recipient container 250.

Situated between the inner frame 214 and the outer frame 212 is a load bar 216 (See FIG. 16 and FIG. 18) associated with an electronic scale 270 for detecting weight change in the recipient container 250. A computer 230 is preferably affixed to the outer frame 212 comprising means to input data 253 which preferably comprises a keypad or touchscreen 253 for inputting information, parameters 252, or selecting a program 100 and accepting data from the electronic scale 270.

Best shown in FIG. 16, the container 250 includes a lid 213 having an inner surface 215 and a container rinse apparatus 220. The container rinse apparatus 220 includes a conduit 222 attached to a container for rinse water (not shown) and associated with means to convey 226, a nozzle 221 and a switch 224. Lowering a container opening over the nozzle 221 to trip the switch 224 will effect high pressure spay through the nozzle 221 designed to remove the sludge remains of input in the input container 260. Preferably, the container rinse apparatus further comprises a deflector plate 225 and a latching mechanism 280 and 280a. The container rinse apparatus 220 can be use to rinse the recipient container 250 by lowering the lid 213 until the latch 280 and latch receiver 280a engage, and then activating the apparatus. The nozzle 221 provides high-pressure rinse to the deflector plate 225 which is specifically designed to deflect water or rinse solution across the inner surface of the lid 215 and down the sides of the recipient container 250.

The dispenser is equipped with a control box 240 providing means for the computer 230 to control each means to convey 226, and means to affect flow 263, detect whether the latching mechanism 280 is engaged, detect whether the switch 224 is activated for the rinsing mechanism, and generally to operationalize the sequential steps of dispensing inputs and clearing the conduits 226a as required by the selected program 100.

A terminal conveyor 227 conveys each of the inputs to a holding tank (not shown) which may or may not include mixing apparatus.

In operation, each input container 260 containing one input 260a required by a formula or program 100 is associated with a unique means to convey 226, preferably associated with the accessory bar 218. A particular formula or program 100 is selected by the operator, either on site or remotely. The water called for in the formula is weighed in through the recipient tank and transferred to the container associated with the rinsing mechanism. The dispenser dispenses first one input 260a via its uniquely associated means to convey into the recipient tank 250 until the appropriate weight is reached as indicated by the scale 270 associated with the load bar 216. The input 260a is then pumped out of the recipient tank 250. At this point either the next input can be weighed in the same way, or the program may require the recipient tank to be rinsed. If rinse is required, the computer will call for a small amount of water from the water supply. The water will be weighed and added to the batch records. The water is then pumped from the recipient tank through the rinsing apparatus and back into the recipient tank. The flow is controlled by the computer. Flow is activated when either the switch on the rinse nozzle is closed by a container to be rinsed or the lid is closed and latched. When a rinsing cycle is complete the contaminated water is pumped out into the holding tank. Air is used to purge all circuits and reduce cross contamination between rinse cycles. Additional rinsing cycles can be done to improve cleaning.

In the preferred embodiment, the dispenser is equipped with at least one sensor 271 to determine the quality of the rinse water after use or to determine the quality of water being added as an input. The sensor may be pH, color, clarity, or other suitable type. Once rinse is finished for this input, the operator may wish to rinse the input container which is accomplished by lowering the opening over the nozzle 221 until the container triggers the switch 224 and pressurized rinse water is sprayed. When the desired volume of input has been added, and rinsing related to this input is completed, then the computer calls for evacuation and forces air through the terminal conveyor 227 to substantially remove remaining liquid. It should be understood that some programs may require complete rinse between inputs as described herein, but other programs may require little or no rinsing until all inputs have been included. The final "input" of the program is the rinse water. The dispenser may be configured in a number of different ways so that the terminal conveyor 227 may convey the inputs to a mixing tank, a holding tank, or directly to an applicator.

The preferred embodiment includes a tilt or slope sensor 290. If the dispenser 210 is placed on a slope, the sensor 290 provides data to the computer 230 so that the computer can adjust the readings from the electronic scale 270 to account for the effect of the slope on the weight of each input when it is transferred to the recipient tank 250.

Because accurately identifying each input is critical to the effective use of the dispenser 210, the dispenser is preferably equipped to read data stored on media associated with an input container 260. For example, RFID information stored on a chip attached to a container 260 could be read by an RFID reader associated with the dispenser 210 and the computer 230 and employed as data input for the program 100. If the read data did not match the input required by the program 100, the program would cease operation or may, abort, or alarm until an operator could override or resolve the issue. Bar codes and readers could be employed. Alternatively, a coupler in a hose (as is known in the art) used to attach the input container 260 to the dispenser 210 and a mating coupler 292 on the dispenser 210 (also known in the art) could be equipped with a memory chip to transfer identifying information to the computer 230 with the same general effect. In this alternative, dry-break couplers are preferred. A dry-break coupler as known in the art comprises means to stop the flow of liquid into each mating coupler prior to engagement and disengagement. The technology employed could include any technology capable of transmitting data.

Thus, the present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced otherwise than as specifically described.

What we claim is:

1. A computer-aided batch input dispenser and recorder for agricultural application comprising:
    a) a plurality of inputs;
    b) at least one input container each said container comprising an opening and associated with means to affect flow;
    c) a recipient tank having an open top and a closeable lid for directly covering said open top;
    d) a rinsing mechanism positioned in said recipient tank for rinsing said recipient tank;
    e) a formula for determining relative amounts of each said plurality of inputs;
    f) separate means for conveying each of said plurality of inputs to the recipient tank;
    g) a computer associated with and in control of each said means to affect flow and means to convey each said input;
    h) data;
    i) said computer further associated with a program wherein said program applies said formula to the data and the computer directs each said means to effect flow and each said means to convey in compliance with the formula.

2. The dispenser claimed in claim 1, said recipient tank associated with an electronic scale and said electronic scale associated with said computer wherein said computer directs each said means to effect flow and each said means to convey to move an appropriate volume of each said input to said recipient tank as determined by the electronic scale.

3. The dispenser claimed in claim 2, said means to effect flow comprising a valve and means to convey comprising a pump and a conduit.

4. The dispenser claimed in claim 1, said recipient tank associated with an electronic scale, said electronic scale associated with said computer wherein said computer actuates said means to effect flow and said means to convey one of said plurality of inputs through said means to convey to said receiving tank until the electronic scale indicates an amount generally equal to the amount required by the application of said formula by said computer, and actuates means to generally empty said recipient tank into a holding tank.

5. The dispenser claimed in claim 2 wherein said dispenser further comprises an outer frame, said lid associated with the outer frame, an inner frame associated with the recipient tank and not associated with the lid, at least one load bar associated with said electronic scale and located between the inner frame and the outer frame for measuring weight change in the recipient tank.

6. The dispenser claimed in claim 5 wherein the dispenser further comprises a container and recipient tank rinsing mechanism substantially within the recipient tank.

7. The dispenser claimed in claim 5 wherein said rinsing mechanism comprises a nozzle, a conduit, and a pump for providing a rinse solution at pressure adequate to remove remaining input.

8. The dispenser claimed in claim 7 wherein the lid comprises an inner surface, said inner surface comprising a specifically positioned and shaped deflection shield for redirecting the rinse solution across the inner surface and down the sides of the tank.

9. The dispenser of claim 7 wherein said lid comprises a latching mechanism and said container and recipient tank rinsing mechanism operates only when the lid is latched.

10. The dispenser of claim 7 wherein the container and recipient tank rinsing mechanism includes a switch activated by the inversion of a container over the nozzle, said switch activating the rinsing mechanism for the container, and said lid comprises a latching mechanism wherein said container rinsing mechanism may be operated to rinse the recipient container only upon latching the lid.

11. The dispenser of claim 1 further comprising at least one tilt sensor and an automatic calculation adjustment to compensate for the tilt to provide accurate weight measurement.

12. The dispenser of claim 5 further comprising at least one tilt sensor and an automatic calculation adjustment to compensate for the tilt to provide accurate weight measurement.

13. The dispenser of claim 1 wherein said computer comprises wifi capability for accepting information and commands conveyed to it by another computer, and for obtaining data from internet sources.

14. The dispenser of claim 1 further comprising means to identify contents in a container.

15. The dispenser of claim 14 wherein means to identify comprises a reader for information stored in RFID format and RFID readable data associated with a container is transmitted to the computer.

16. The dispenser of claim 14 wherein means to identify contents comprises a memory chip embedded in a hose connector attached to a bulk container, and a mating connector attached to the dispenser wherein upon coupling the hose connector and the mating connector the computer receives a set of data regarding the contents in the container.

17. The dispenser of claim 15 wherein the computer determines whether the transmitted data identifies an input appropriate for the formula, said computer activating means to affect flow and convey only if the formula comprises the input identified.

18. The dispenser of claim 14 wherein means to identify contents comprises a wire tag associated with a hose connector attached to a bulk container, and a mating connector attached to the dispenser and proximal a socket wherein upon coupling the hose connector and the mating connector, the tag is inserted into the socket and the computer recognizes the container.

19. A computer-aided batch input dispenser and recorder for agricultural application comprising:
 a) a plurality of inputs each housed in one of a plurality of containers;
 b) at least one means to affect flow, each said at least one means to affect flow associated with said at least one container;
 c) separate means for conveying at least two of said plurality of inputs to a recipient tank;
 d) said recipient tank having an open top and a closeable lid for covering said open top;
 e) a rinsing mechanism positioned in said recipient tank for rinsing said recipient tank when the lid is closed;
 f) a holding tank for receiving each said input from said recipient tank;
 g) a formula for determining relative amounts of each of said plurality of inputs; and
 h) a computer associated with and in control of at least one of said means to affect flow, and a program.

20. A method of using the dispenser of claim 19 comprising weighing in an amount of diluent according to the formula.

21. The method of claim 20 wherein said rinsing mechanism employs at least a portion of said diluent to rinse the recipient tank after the addition of at least one said input.

22. The method of claim 20 wherein said rinsing mechanism employs at least a portion of said diluent to rinse the recipient tank after the addition of each said at least one input.

23. A method of using the dispenser of claim 19 wherein said computer runs the program which applies said formula and directs each said means to effect flow in compliance with the formula.

24. The method of claim 23 wherein said computer activates said rinsing mechanism after said holding tank has received said at least one input.

* * * * *